(12) United States Patent
Lan et al.

(10) Patent No.: US 11,594,804 B2
(45) Date of Patent: Feb. 28, 2023

(54) ANTENNA ON GLASS WITH AIR CAVITY STRUCTURE

(71) Applicant: QUALCOMM Incorporated, San Diego, CA (US)

(72) Inventors: Je-Hsiung Lan, San Diego, CA (US); Sang-June Park, San Diego, CA (US); Jonghae Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 16/910,025

(22) Filed: Jun. 23, 2020

(65) Prior Publication Data

US 2021/0399404 A1    Dec. 23, 2021

(51) Int. Cl.
 *H01Q 13/18*  (2006.01)
 *H01Q 1/12*   (2006.01)
 *H01Q 23/00*  (2006.01)

(52) U.S. Cl.
 CPC ........... *H01Q 1/1285* (2013.01); *H01Q 13/18* (2013.01); *H01Q 23/00* (2013.01)

(58) Field of Classification Search
 CPC ...... H01Q 1/1285; H01Q 1/2283; H01Q 1/38; H01Q 13/18; H01Q 23/00; H01Q 9/0407; C03C 4/04; C03C 27/06
 See application file for complete search history.

(56) References Cited

U.S. PATENT DOCUMENTS

| | | | |
|---|---|---|---|
| 2020/0127366 A1* | 4/2020 | Liao | H01Q 1/22 |
| 2020/0235716 A1* | 7/2020 | Eid | H03H 9/0557 |
| 2020/0373259 A1* | 11/2020 | Koller | H01P 3/003 |
| 2021/0084747 A1* | 3/2021 | Schrems | H05K 1/114 |
| 2021/0257741 A1* | 8/2021 | Flemming | C03C 17/002 |

FOREIGN PATENT DOCUMENTS

| | | |
|---|---|---|
| CA | 3112608 A1 | 3/2020 |
| CN | 209880606 U | 12/2019 |
| WO | 2007149046 A1 | 12/2007 |

OTHER PUBLICATIONS

International Search Report and Written Opinion—PCT/US2021/029690—ISA/EPO—dated Dec. 7, 2021.
Partial International Search Report—PCT/US2021/029690—ISA/EPO—dated Aug. 25, 2021.

* cited by examiner

*Primary Examiner* — Seokjin Kim
(74) *Attorney, Agent, or Firm* — Qualcomm Incorporated

(57) ABSTRACT

Disclosed is an antenna on glass (AOG) device having an air cavity at least partially formed in a photosensitive glass substrate. An air cavity structure is at least partially encloses the air cavity and wherein the air cavity structure at least partially formed from the photosensitive glass substrate. An antenna is formed from portion of a top conductive layer disposed on a top surface of the air cavity structure and at least partially overlapping the air cavity. A metallization structure is provided having a bottom conductive layer disposed on a bottom surface of the air cavity structure, wherein the bottom conductive layer is electrically coupled to the top metal layer by a conductive pillar disposed through the photosensitive glass substrate. In addition, the AOG device may integrate one or more MIM capacitors and/or inductors that allow for RF filtering and impedance matching.

47 Claims, 20 Drawing Sheets

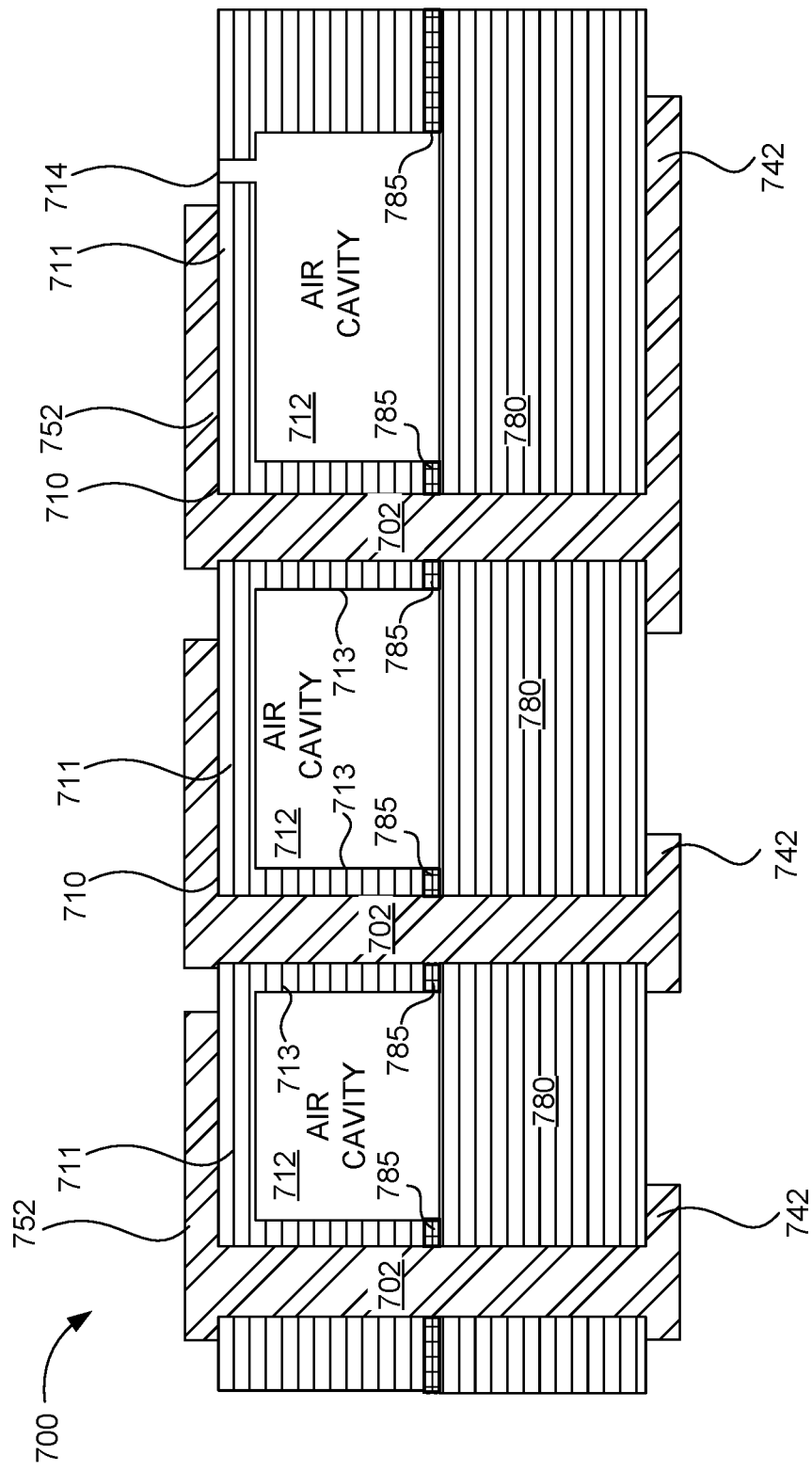

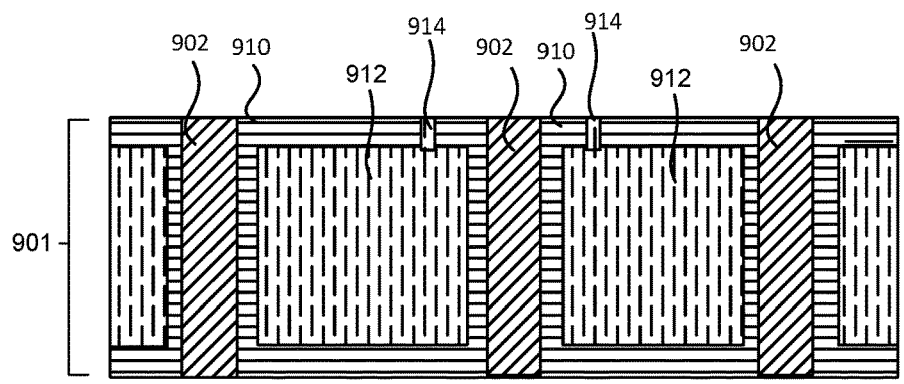
(iv)
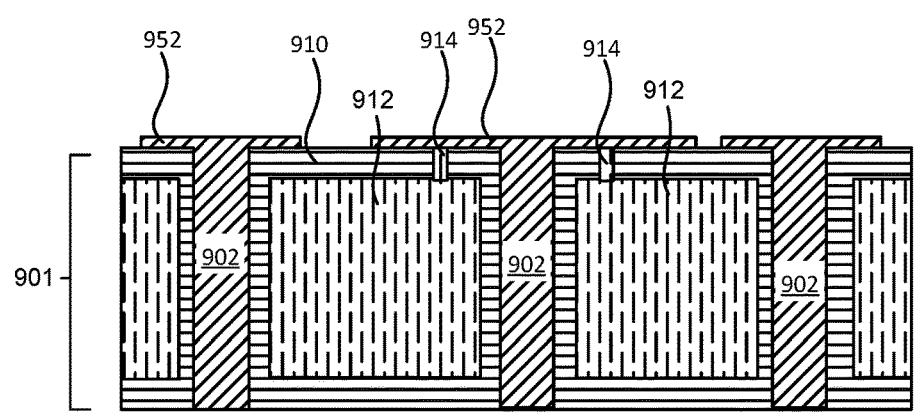
(v)
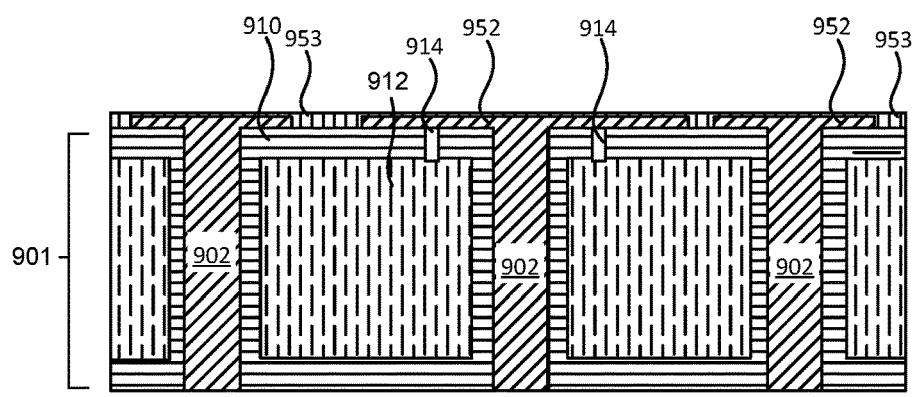
(vi)
FIG. 9B

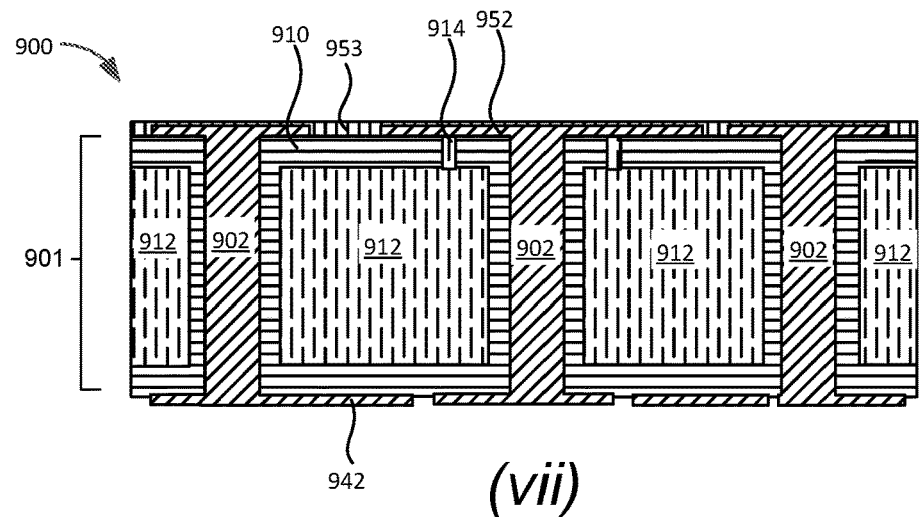
(vii)
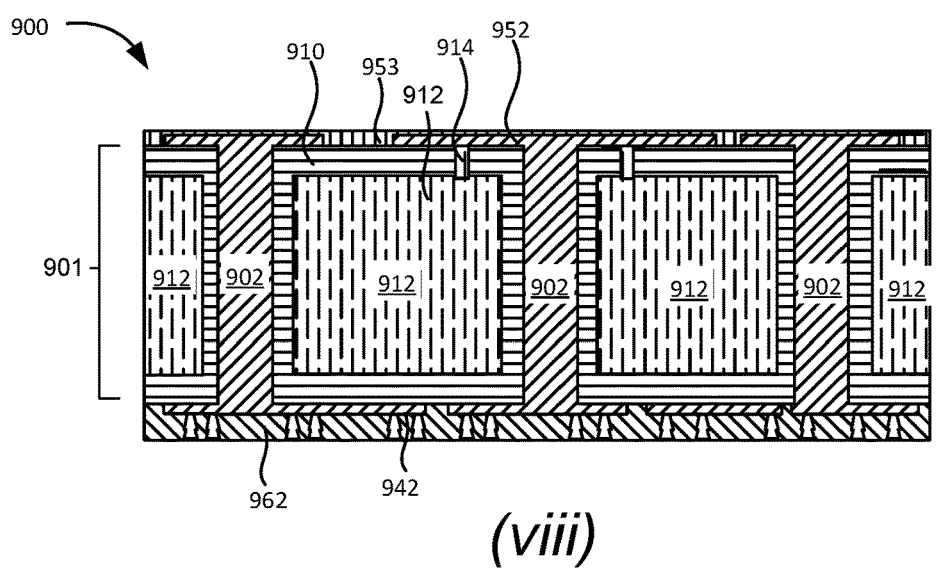
(viii)
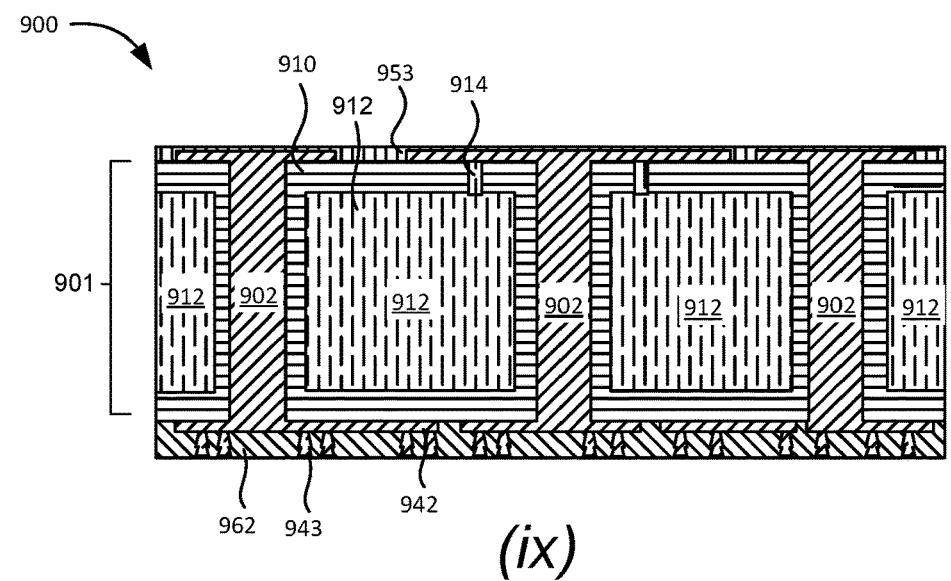
(ix)
FIG. 9C

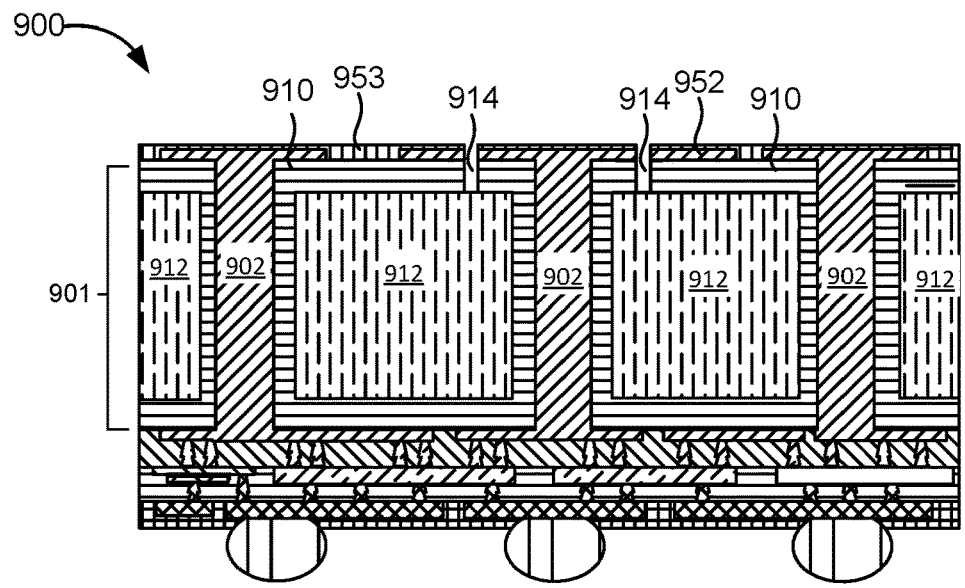
(xvi)
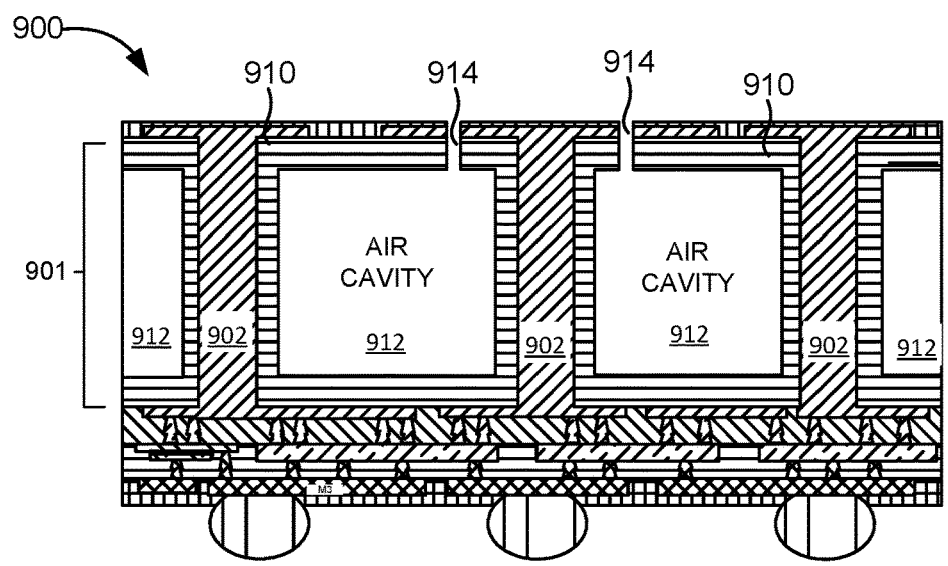
(xvii)
FIG. 9F

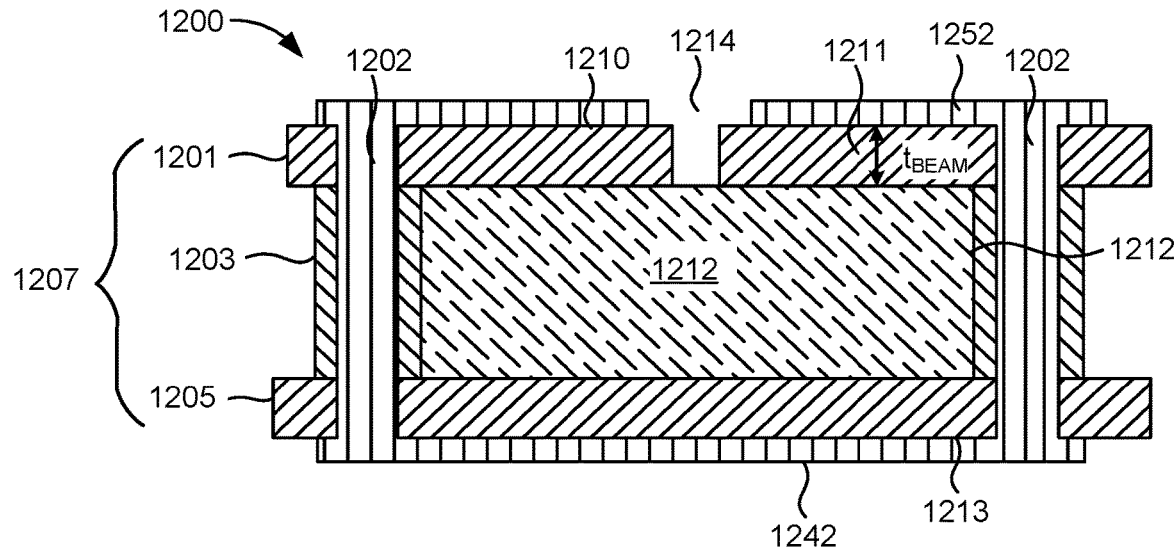
(iv)
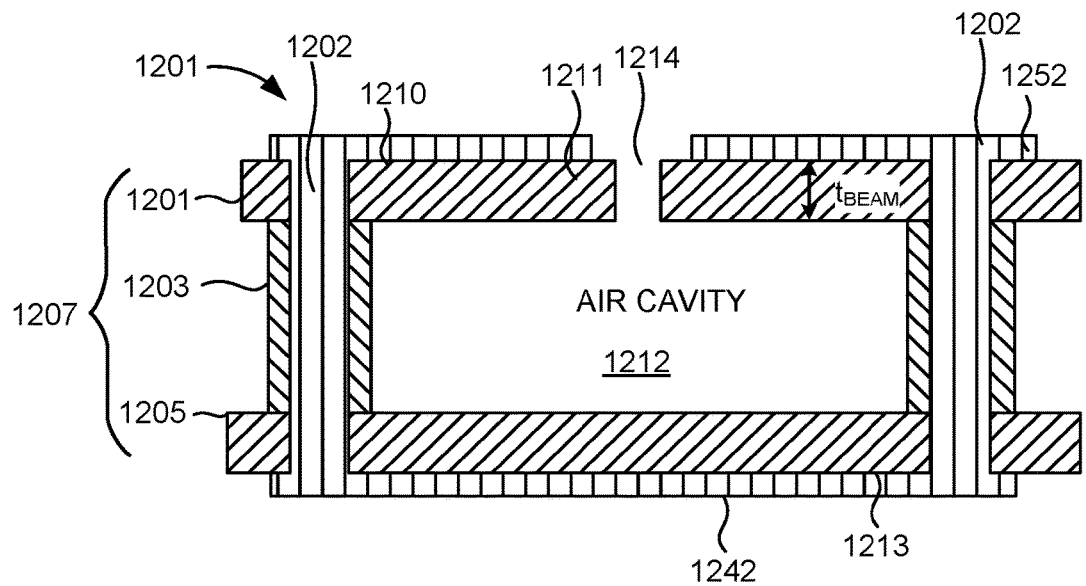
(v)
FIG. 12B

ANTENNA ON GLASS WITH AIR CAVITY STRUCTURE

FIELD OF DISCLOSURE

This disclosure relates generally to antenna, and more specifically, but not exclusively, to antenna on glass device module and fabrication techniques thereof.

BACKGROUND

Integrated circuit technology has achieved great strides in advancing computing power through miniaturization of active components. The package devices can be found in many electronic devices, including processors, servers, radio frequency (RF) integrated circuits, etc. Packaging technology becomes cost-effective in high pin count devices and/or high production volume components.

Additionally, in conventional RF frontend circuitry, the antenna is built and embedded in a package substrate. One limitation is there is no capacitor in the substrate for antenna impedance matching and filtering. Also, conventional substrates are lossy (i.e., electromagnetically inefficient) at a higher frequencies (e.g., mmWave ranges). Accordingly, designers using conventional technology are faced with many issues, including low antenna gain with high substrate trace loss. Also, there is no matching and filtering capability in the conventional antenna in package (AiP) substrate. The conventional technology is limited in its performance for advanced 5G and future 6G millimeter-Wave (mmWave) RF frontends that will need components and devices with high efficiency with low power consumption.

Accordingly, there is a need for systems, apparatus, and methods that overcome the deficiencies of conventional antenna packages including the methods, system and apparatus provided herein.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In accordance with the various aspects disclosed herein, at least one aspect includes, an antenna on glass (AOG) device having an air cavity at least partially formed in a photosensitive glass substrate. An air cavity structure at least partially encloses the air cavity and wherein the air cavity structure is at least partially formed from the photosensitive glass substrate. An antenna is formed from portion of a top conductive layer disposed on a top surface of the air cavity structure and at least partially overlapping the air cavity. A metallization structure is provided having a bottom conductive layer disposed on a bottom surface of the air cavity structure, wherein the bottom conductive layer is electrically coupled to the top metal layer by a conductive pillar disposed through the photosensitive glass substrate.

In accordance with the various aspects disclosed herein, at least one aspect includes a method for fabricating an antenna on glass (AOG) device. The method may include: forming an air cavity in a photosensitive glass substrate; forming an air cavity structure that is at least partially encloses the air cavity, where the air cavity structure at least partially formed from the photosensitive glass substrate; forming an antenna from portion of a top conductive layer disposed on a top surface of the air cavity structure, where the antenna at least partially overlaps the air cavity; and forming a metallization structure having a bottom conductive layer disposed on a bottom surface of the air cavity structure, where the bottom conductive layer is electrically coupled to the top conductive layer by a conductive pillar disposed through the photosensitive glass substrate.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

FIG. 8 illustrates a portion of the antenna on glass device of FIG. 7 in accordance with at least one aspect of the disclosure.

FIGS. 9A-9F illustrate fabrication techniques in accordance with one or more aspects of the disclosure.

FIGS. 12A-12B illustrate fabrication techniques in accordance with one or more aspects of the disclosure.

Figure 1:
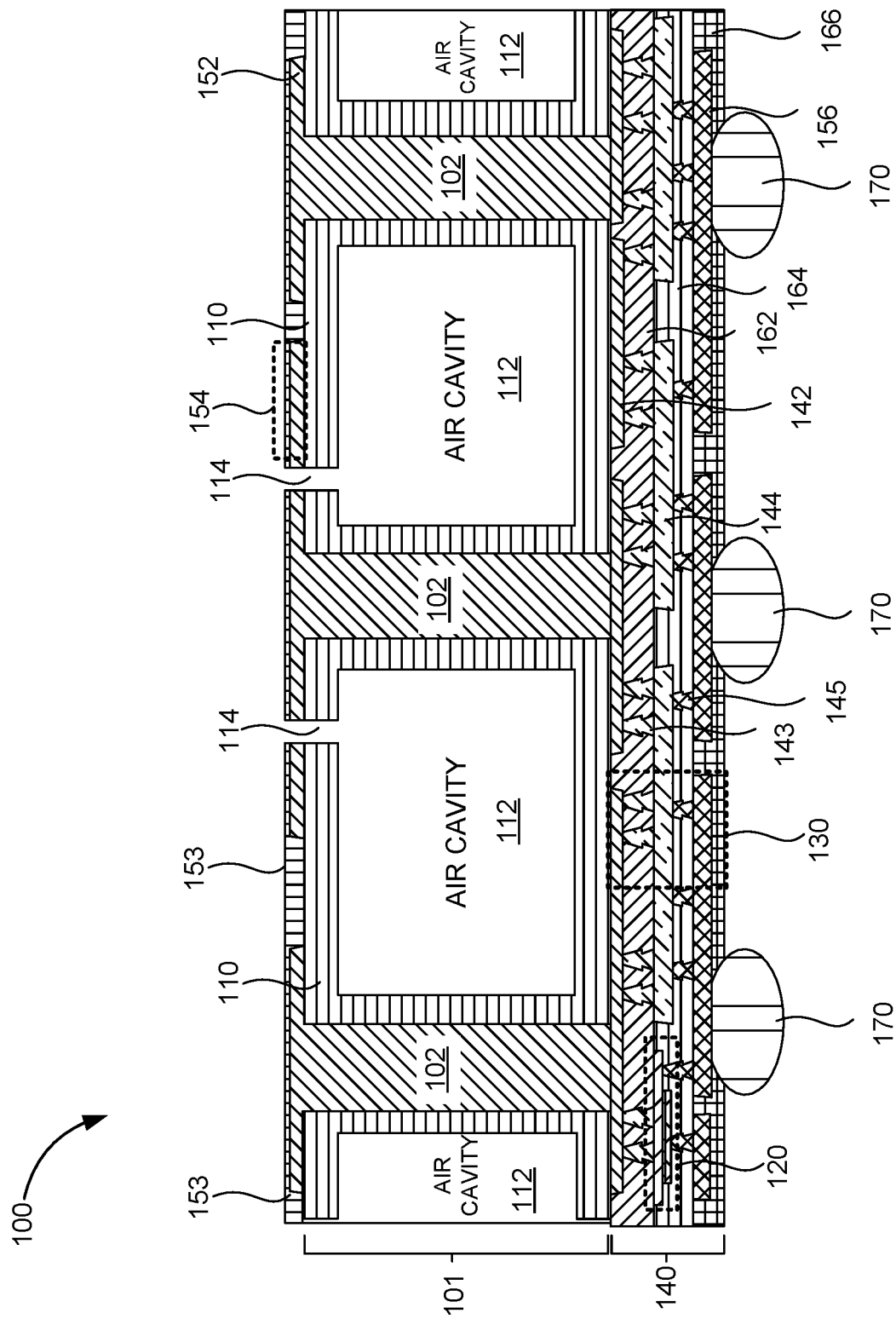
FIG. 1 illustrates an antenna on glass device in accordance with at least one aspect of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the present disclosure are illustrated in the following description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

FIG. 1 illustrates an antenna on glass (AOG) device 100 in accordance with at least one aspect of the disclosure. The AOG device 100 includes an air cavity structure 110 and air cavity 112 that are at least partially formed in a photosensitive glass substrate 101 The AOG device 100 allows for the integration of one or more metal-insulator-metal (MIM) capacitors 120 and/or inductors 130 into the AOG device 100 for RF filtering and/or impedance matching for high frequency applications, such as 5G mmWave frequencies.

The air cavity 112 has an improved permittivity (Dk) and loss tangent (Df) over conventional designs, since for air (Dk=1, Df=0). The air cavity 112 can be formed by removing a portion of the photosensitive glass substrate 101. The photosensitive glass substrate 101 is also used to form the air cavity structure 110. The air cavity 112 may be formed by converting the exposed glass region to ceramic by varying an ultraviolet (UV) laser beam with different focal depths and then removing the converted ceramic out through the etch holes 114. The AOG device 100 may also include a top conductive layer 152 and top insulating layer 153. The top conductive layer may be formed from conductive materials, such as Cu that is plated and patterned on the glass of air cavity structure 110. A portion of the top conductive layer 152 may be patterned to form antenna(s) 154, which may be patch antennas or the like. The antenna(s) 154 along with the top conductive layer 152 may be covered by the top insulating layer 153 for passivation and protection of the antenna(s) 154. The top conductive layer 152 and antennas 154 may be copper (Cu), or other conductive materials with high conductivity such as silver (Ag), gold (Au), aluminum (Al) and other like materials, alloys or combination of materials. The top insulating layer 153 may be in interlayer dielectric (ILD) layer. The ILD layer 153 may be formed of materials such as doped silicon dioxide ($SiO_2$), or its fluorine-doped, carbon-doped, and carbon-doped forms, as well as spin-on organic polymeric dielectrics such as polyimide (PI), polynorbornenes, benzocyclobutene (BCB), polytetrafluoroethylene (PTFE) and/or silicone based polymeric dielectrics.

The AOG device 100 also includes features such as through-glass vias (TGV)/conductive pillars (e.g., copper (Cu)), referred to herein as TGVs 102. The MIM capacitor(s) 120 may be formed at least in part from a portion of the metallization structure 140. Likewise, the inductor(s) 130 may be formed at least in part from a portion of the metallization structure 140. The MIM capacitor(s) 120 and inductor(s) 130 may be used for RF filtering and impedance matching. The metallization structure 140 may be formed from a plurality of conductive layers and insulating layers. For example, conductive layers 142, 144 and 146 may be copper (Cu), or other conductive materials with high conductivity such as silver (Ag), gold (Au), aluminum (Al) and other like materials, alloys or combination of materials. The insulating layers may be formed as interlayer dielectric (ILD) layers 162, 164 and 166. The ILD layers 162, 164 and 166 may be formed of materials such as doped silicon dioxide ($SiO_2$), or its fluorine-doped, carbon-doped, and carbon-doped forms, as well as spin-on organic polymeric dielectrics such as polyimide (PI), polynorbornenes, benzocyclobutene (BCB), polytetrafluoroethylene (PTFE) and/or silicone based polymeric dielectrics.

The AOG device 100 may also include one or more connection structures 170 that facilitate electrical and/or mechanical coupling of the AOG device 100 to external circuits/devices. In some aspects the connection structures 170 may be one or more of a wafer-level package (WLP) ball, a Cu pillar, CU pillar with solder bump, and the like. The connection structures 170 may be coupled to the conductive layer 146 through openings in the insulating layer 166. The RF signals and optionally other signals and/or power may be conducted from the connection structures 170 through metallization structure 140 using via 145 between the conductive layers 146 and 144, and via 143 between the conductive layer 144 and bottom conductive layer 142, then coupling to conductive pillars 102, such as, through-glass vias (TGVs), Cu pillars and the like, which may also be referred to herein as TGVs 102. The conductive pillars 102 are electrically coupled to the top conductive layer 152, which may include one or more antenna(s) 154. The MIM capacitor(s) 120 may be formed at least in part from a portion of the metallization structure 140. Likewise, the inductor(s) 130 may be formed at least in part from a portion of the metallization structure 140 and may be a planar inductor (e.g., 2 dimensional (2D) spiral inductor), 2.5D inductor or 3D inductor, formed on one or more conductive layers of the metallization structure 140, as is known in the art. The MIM capacitor(s) 120 and inductor(s) 130 may be used for RF filtering and impedance matching. The metallization structure 140 may be formed from a plurality of conductive layers and insulating layers, discussed in greater detail in the following.

Figure 2:
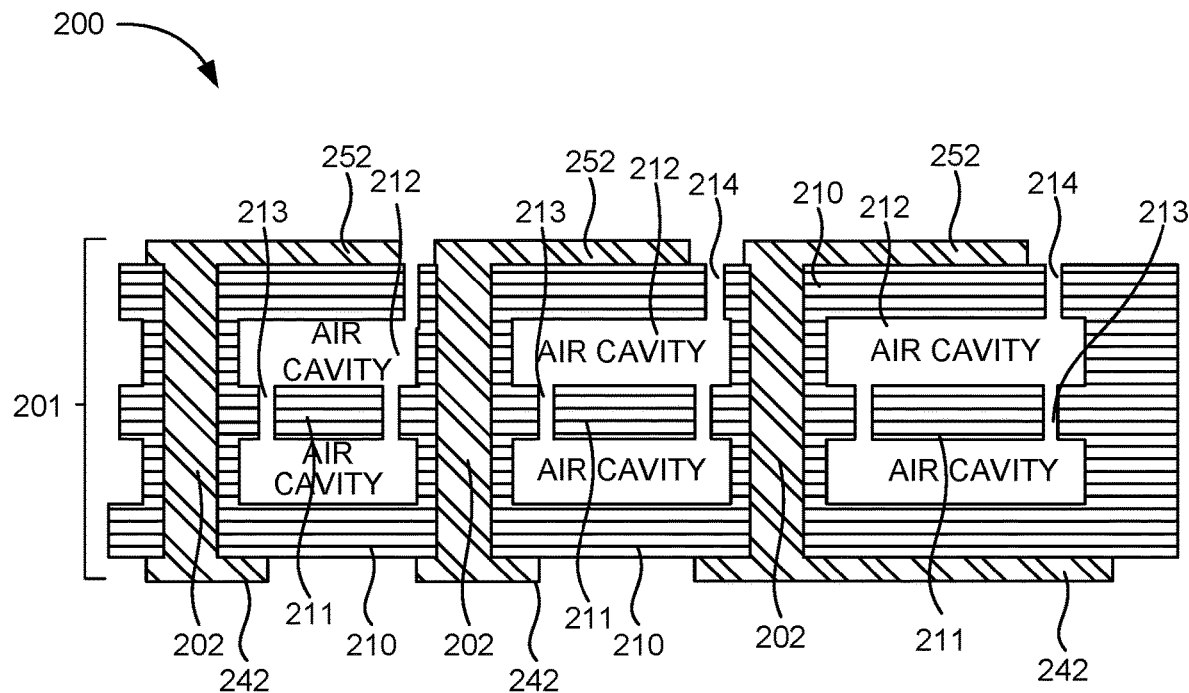
FIG. 2 illustrates another configuration of a portion of an antenna on glass device in accordance with at least one aspect of the disclosure.

FIG. 2 illustrates another configuration of a portion of an AOG device 200 in accordance with at least one aspect of the disclosure. An alternative air cavity 212 configuration is illustrated. The air cavity 212 can be formed by removing a portion of the photosensitive glass substrate 201. The photosensitive glass substrate 201 also forms the air cavity structure 210 from the uncured photosensitive glass. As discussed in relation to AOG device 100, the air cavity 212 can be formed by converting the exposed glass region to ceramic by varying the UV laser beam with different focal depths and then removing the converted ceramic out through the etch holes 214. As used herein the term "etch holes" relates to any opening to the air cavity 212 region to allow removal of the ceramic (converted glass) material from the photosensitive glass substrate 201 after etching. Accordingly, the etch holes 214 do not have to have a circular configuration and may be formed as slots or any other geometric configuration. Alternatively, the air cavity in the glass can also be fabricated by direct femtosecond laser writing followed by heat treatment and successive wet etching. In the illustrated aspect of FIG. 2, the air cavity 212 may be formed of two or more cavities that are joined internally with cavity vents 213. It will be appreciated that having the two cavities allows for an internal beam 211 to be formed, which can provide additional structural strength. As discussed in relation to AOG device 100, a top conductive layer 252 is provided. The top conductive layer 252 may be formed from a conductive material, such as Cu or others discussed here, that is plated and patterned on a top portion of air cavity structure 210 formed from the unconverted photosensitive glass. A portion of the top conductive layer 252 may be patterned to form one or more antennas, which may be patch antennas or the like, as discussed above. A bottom conductive layer 242 may be formed from a conductive material, such as Cu or others discussed herein, that is plated and patterned on a bottom portion of air cavity structure 210. The top conductive layer 252 and bottom conductive layer 242 may be electrically coupled by a conductive pillar 202, which may be formed as a TGV. The remaining structural components of the AOG device 200 are not illustrated for brevity, but may be similar to AOG device 100 or other AOG devices disclosed herein. Further it will be appreciated from the foregoing, that in the various aspects disclosed, the air cavity configuration may take various forms and is not limited to the illustrated configurations provided herein.

Figure 3:
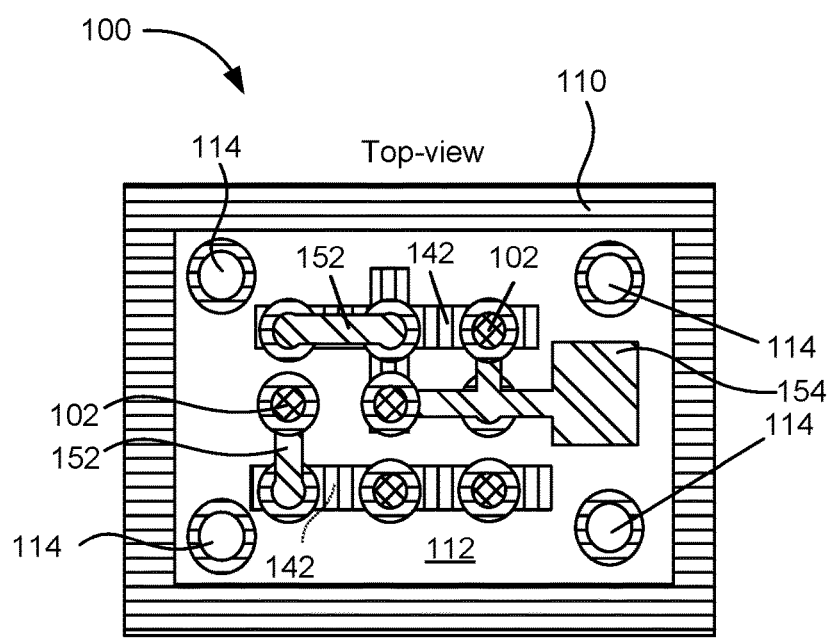
FIG. 3 illustrates a top view of a portion of an antenna on glass device in accordance with at least one aspect of the disclosure.

FIG. 3 illustrates a top view of a portion of the AOG device 100, in accordance with at least one aspect of the disclosure. The top view illustrates multiple structures at various layers/depths (e.g., top conductive layer 252 and bottom conductive layer 242) and is not to be construed as a cross-sectional sectional illustration. As discussed above, the unconverted photosensitive glass forms the air cavity structure 110. Further, the etch holes 114 are opened to the air cavity 112 to allow for the removal of the converted ceramic during the fabrication process (discussed in greater detail below). As discussed above in relation to AOG device 100, a top conductive layer 152 is also provided. A portion of the top conductive layer 152 may be patterned to form antenna 154, which may be a patch antenna or the like. The bottom conductive layer 142 may also be formed from a conductive material, such as Cu or others discussed here, that is plated and patterned on a bottom portion of air cavity structure 110. The top conductive layer 152 and bottom conductive layer 142 may be electrically coupled by conductive pillars 102, which may be formed as TGV filled with Cu or other conductive material. It will be appreciated that the aforementioned aspects and illustrations are merely provided as examples and the various aspects of the disclosure are not limited to the specific description, references and/or illustrations provided as examples.

Figure 4:
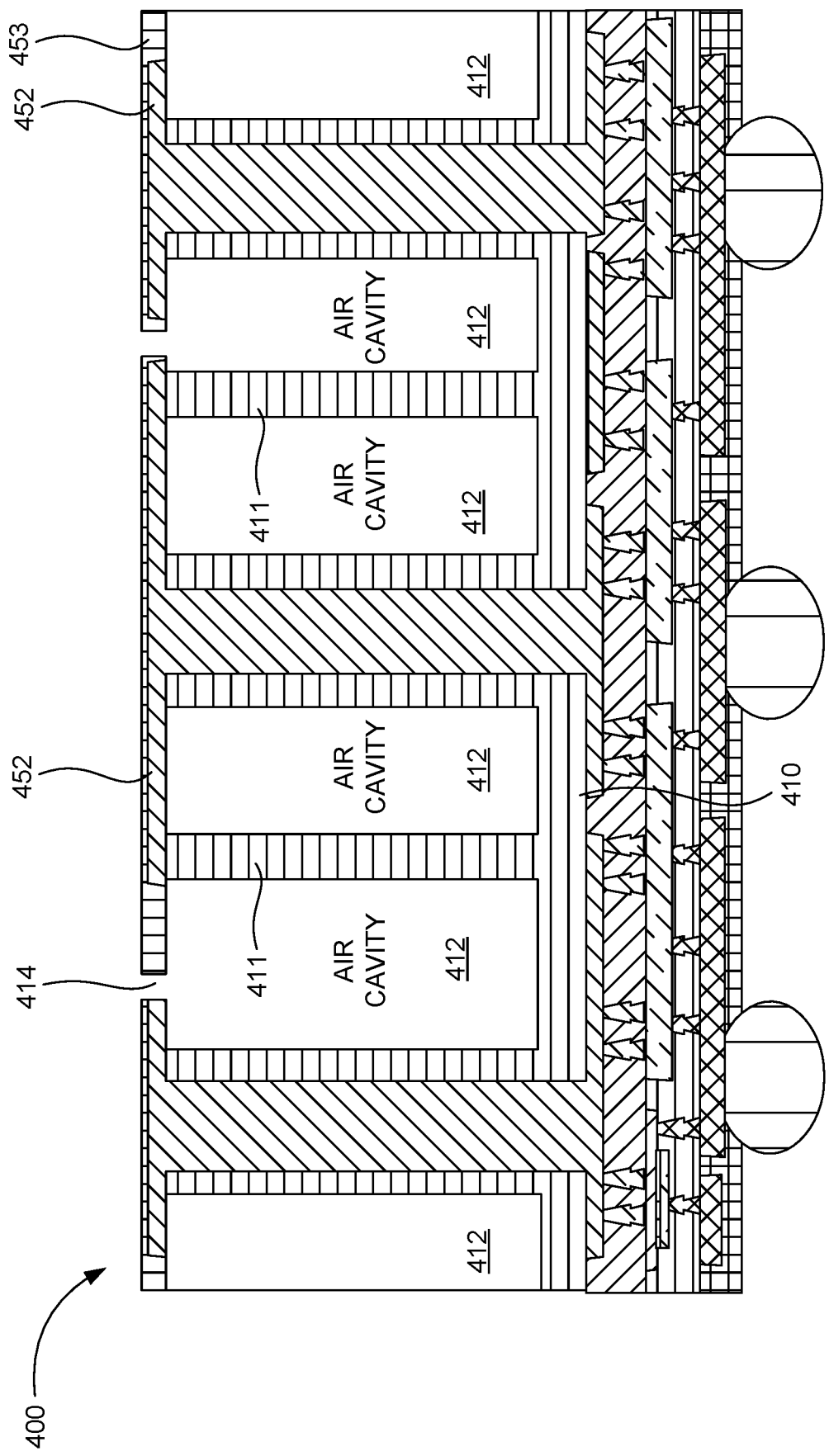
FIG. 4 illustrates another configuration of an antenna on glass device in accordance with at least one aspect of the disclosure.

FIG. 4 illustrates another configuration of an AOG device 400 in accordance with at least one aspect of the disclosure. An alternative air cavity 412 configuration is illustrated. The air cavity 412 can be formed by removing a portion of the photosensitive glass. The photosensitive glass (unconverted) also forms the air cavity structure 410. As previously discussed, in at least one aspect, the air cavity 412 is formed by converting the exposed glass region to ceramic by varying the UV laser beam with different focal depths and then removing the converted ceramic out through the etch holes 414. In the illustrated aspect of FIG. 4, the air cavity 412 may be formed of two or more cavities that may be joined internally with cavity vents or alternatively may be joined with in the non-glass pillar area (each not illustrated). It will be appreciated that having the two cavities allows for an internal beam 411 to be formed, which can provide additional structural strength. In this configuration, the internal beam 411 between the two cavities is substantially vertical and provides support for the top conductive layer 452 since there is no top beam of unconverted photosensitive glass. In alternative configurations, a top beam could be provided with the internal beam 411 being used to provide additional support to the top beam. Other features and components illustrated are similar to those discussed in relation to AOG device 100. Accordingly, a detailed recitation of each of the illustrated features will not be provided to avoid redundancy. Further it will be appreciated from the foregoing, that in the various aspects disclosed, the air cavity configuration may take various forms along with other features and the aspects disclosed are not limited to the illustrated configurations provided herein.

Figure 5:
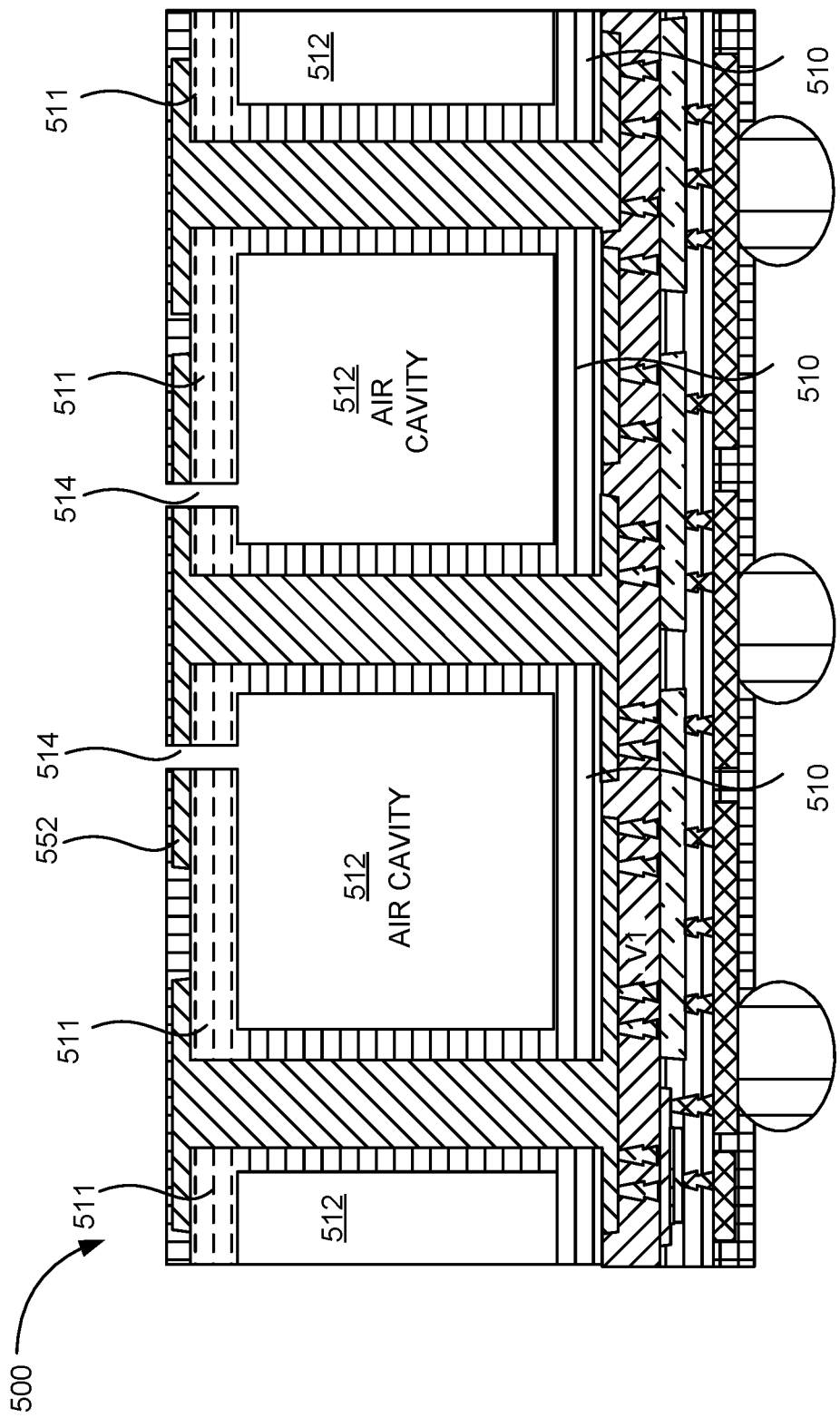
FIG. 5 illustrates another configuration of an antenna on glass device in accordance with at least one aspect of the disclosure.

FIG. 5 illustrates another configuration of a portion of an AOG device 500 in accordance with at least one aspect of the disclosure. The air cavity 512 can be formed by removing a portion of the photosensitive glass. The photosensitive glass also forms a portion of the air cavity structure 510. As previously discussed, in at least one aspect, the air cavity 512 is formed by converting the exposed glass region to ceramic by varying the UV laser beam with different focal depths and then removing the converted ceramic out through the etch holes 514. In the illustrated aspect of FIG. 5, a top beam 511 may be formed of a second material, which is a low Dk and Df dielectric material. The second material may be least one of silicon dioxide ($SiO_2$) or benzocyclobutene (BCB) or other like materials. In this configuration, the top beam 511 forms the top portion enclosing the air cavity 512 and may be formed on the air cavity portion before the material in the cavity is removed. In some examples, the low Dk and Df dielectric forming the top beam 511 can be applied by physical vapor deposition (PVD) or spin-coating over the photosensitive glass (PSG) that has been UV-exposed and converted to ceramic. The etch holes 514 can be formed in the top beam 511 (e.g., the low Dk/Df dielectric) by photolithography. The air cavity 512 can be formed by etching the ceramic out from the etch holes 514 formed through the top beam 511.

The top beam 511 provides support for the top conductive trace 552 since there is no top beam of un-converted photosensitive glass. Other features and components illustrated are similar to those discussed in relation to AOG device 100. Accordingly, a detailed recitation of each of the illustrated features will not be provided to avoid redundancy. Further it will be appreciated from the foregoing, that in the various aspects disclosed, may take various forms and/or configurations and are not limited to the illustrated configurations provided herein.

Figure 6:
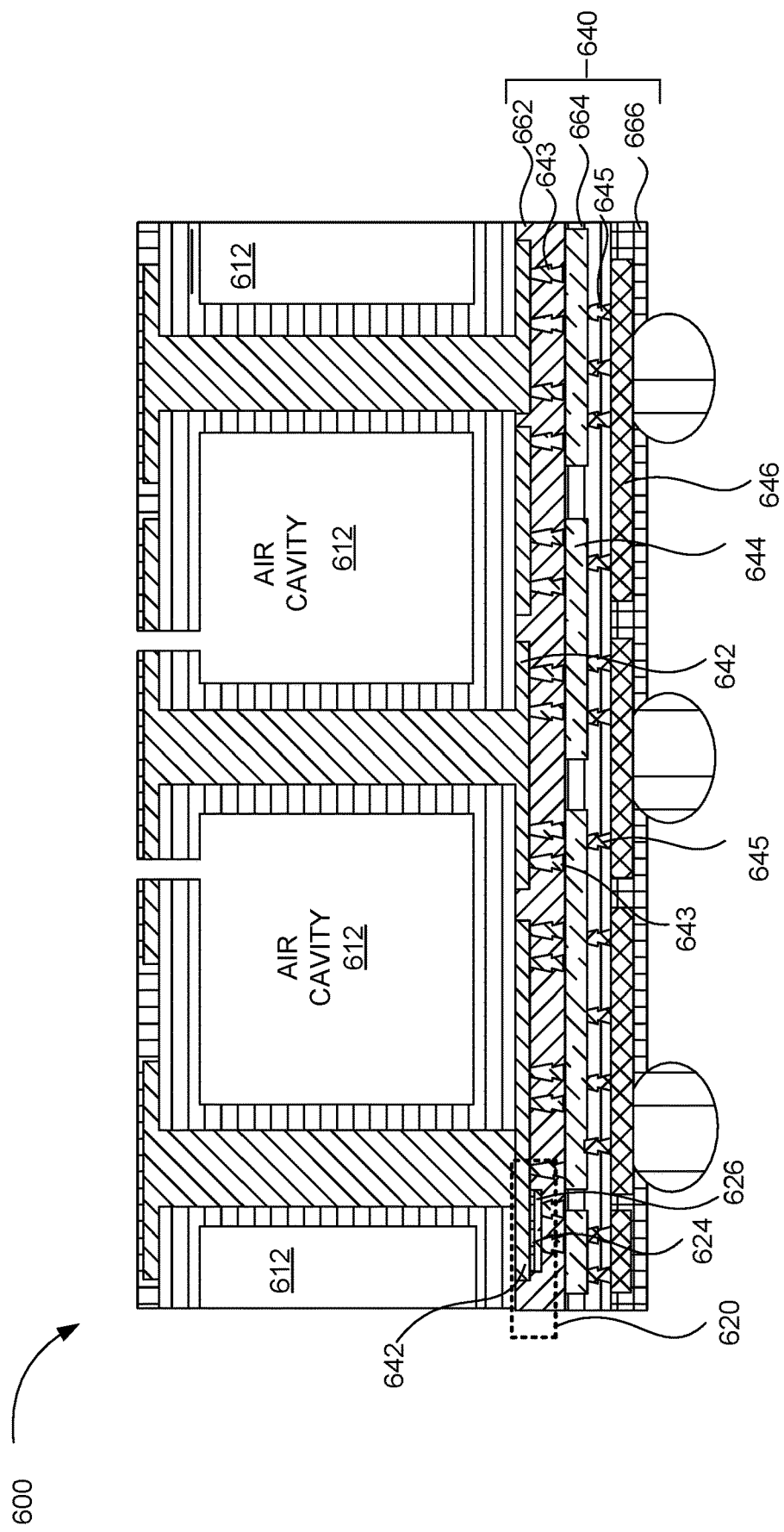
FIG. 6 illustrates another configuration of an antenna on glass device in accordance with at least one aspect of the disclosure.

FIG. 6 illustrates another configuration of a portion of an AOG device 600 in accordance with at least one aspect of the disclosure. A metallization structure 640 has vias 645 between the conductive layers 646 and 644, and vias 643 between the conductive layer 644 and bottom conductive layer 642. The metallization structure 640 also includes insulating layers, which may be formed as interlayer dielectric (ILD) layers 662, 664 and 666. The ILD layers 662, 664 and 666 may be formed of materials such as silicon dioxide ($SiO_2$) or other materials, as disclosed herein. The MIM capacitor 620 in this configuration may be formed at least in part from a portion of the metallization structure 640. Specifically, the bottom conductive layer 642 is also used to form the bottom metal of the MIM capacitor 620. A dielectric layer 624 is disposed between the bottom conductive layer 642 and a top metal 626 of the MIM capacitor 620. The MIM capacitor is formed in ILD layer 662 and is coupled to the other AOG device 600 components using the bottom conductive layer 642 and through one or more vias 643 to conductive layer 644. It will be appreciated that this configuration of the MIM capacitor 620 may be used in the other configurations described herein and illustrated in associated figures. Other features and components illustrated are similar to those discussed in relation to AOG device 100. Accordingly, a detailed recitation of each of the illustrated features will not be provided to avoid redundancy. Further it will be appreciated from the foregoing, that the various aspects disclosed, may take various forms and/or configurations and are not limited to the illustrated forms and/or configurations provided herein.

Figure 7:
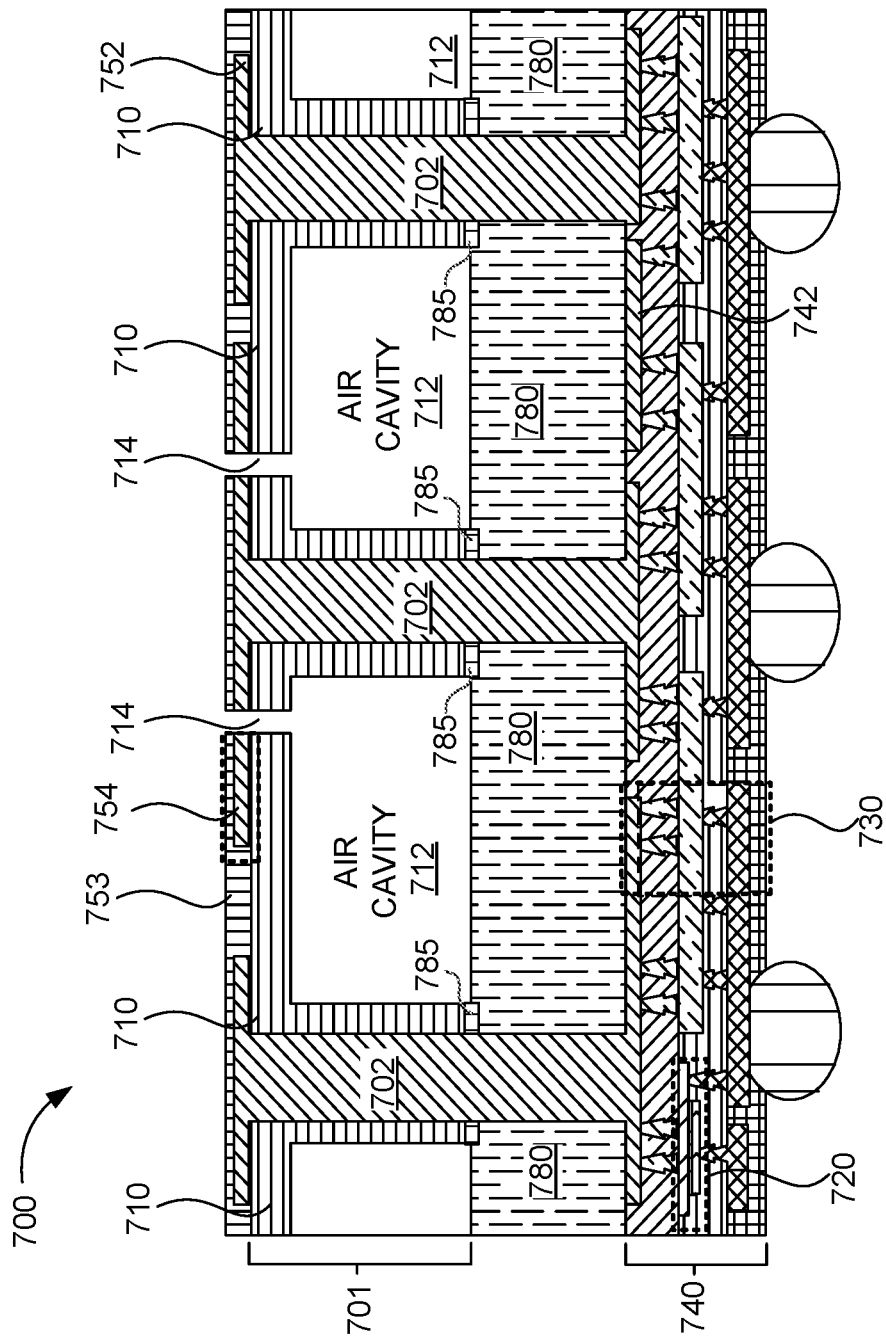
FIG. 7 illustrates another configuration of an antenna on glass device in accordance with at least one aspect of the disclosure.

FIG. 7 illustrates another configuration of a portion of an AOG device 700 in accordance with at least one aspect of the disclosure. This configuration generally has an open air cavity 712 with the bottom portion of air cavity structure 710 being open. As in the prior examples, the air cavity 712 can be formed by removing a portion of the photosensitive glass substrate 701. The photosensitive glass substrate 7101 is also used to form part of the air cavity structure 710. The air cavity 712 is formed by converting a region of the photosensitive glass substrate 7101 to ceramic and removing the converted ceramic out through the etch holes 714, as discussed herein. The AOG device 700 may also include a top conductive layer 752 and top insulating layer 753. The top conductive layer 752 may be formed from conductive materials as discussed herein, such as Cu that is plated and patterned on the unconverted photosensitive glass of air cavity structure 710, which supports the top conductive layer 752 and top insulating layer 753. A portion of the top conductive layer 752 may be patterned to form an antenna 754 or a plurality of antennas, which may be patch antennas or the like.

As noted above, the configuration illustrated in FIG. 7 generally has an open air cavity 712 with the bottom portion of air cavity structure 710 being open. The bottom portion 780 of the air cavity 712 can be formed by a second glass material that has a low Dk and Df. The bottom portion 780 substrate material can also be quartz. (e.g., silica that has low Dk and low Df). The bottom portion 780 substrate material does not need to be a photosensitive glass material. The bottom portion 780 may be bonded to the air cavity structure 710 by a bonding layer 785. The bonding layer 785 may be formed of one or more layers of glass to glass/oxide to oxide bonding material, such as $SiO_2$, silicon oxynitride (SiONx), and like material.

The AOG device 700 also includes a metallization structure 740 that may be formed on the bottom portion 780, including a bottom conductive layer 742 among additional conductive and insulating layers, as discussed herein. The conductive pillars 702, such as through-glass vias (TGV) filled with conductive material (e.g., Cu) will penetrate through the various materials, such as the photosensitive glass substrate 701 adjacent the air cavity structure 710, bottom portion 780 and bonding layer 785, to allow electrical coupling of the top conductive layer 752 and bottom conductive layer 742. The MIM capacitor(s) 720 may be formed at least in part from a portion of the metallization structure 740. However, as discussed above, the MIM capacitor 720 may be formed in different conductive and/or insulating layers of the metallization structure 740, other than the configuration illustrated. Likewise, the inductor(s) 730 may be formed at least in part from a portion of the metallization structure 740. The inductor(s) 730 may reside in one or more layers of the metallization structure 740, depending on the inductor design (e.g., planar, 3D, etc.). The MIM capacitor(s) 720 and inductor(s) 730 may be used for RF filtering and impedance matching, as discussed above. Other features and components illustrated are similar to those discussed in relation to AOG device 100. Accordingly, a detailed recitation of each of the illustrated features will not be provided to avoid redundancy. Further it will be appreciated from the foregoing, that the various aspects disclosed may take various forms and/or configurations and are not limited to the illustrated example configurations provided herein.

FIG. 8 illustrates a portion of the AOG device 700 in accordance with at least one aspect of the disclosure. As noted above the air cavity 712 has an open configuration, with the bottom of the air cavity being "open" because it is not enclosed by the uncured photosensitive glass that forms the air cavity structure 710. For example, the air cavity structure 710 includes a top beam 711 and a sidewall portion 713, but has no bottom beam. The open bottom portion of the air cavity 710 is closed off by the bottom portion 780 which is bonded to the air cavity structure 710 by bonding layer 785. In the illustrated aspect of FIG. 8, although each air cavity 712 may have one or more etch holes 714 coupled to the air cavity 712, the etch holes 714 do not have to be uniform in spacing, size and/or location. Accordingly in the cross-sectional view illustrated, the air cavities 712 on the left may be illustrated covered by top beams that do not have etch holes 714 in those portions, where the right air cavity 712 does have an explicit illustration of the etch hole 714. As discussed in relation to AOG device 700, a top conductive layer 752 is provided. The top conductive layer 752 may be formed from a conductive material, such as Cu or others discussed herein, that is plated and patterned on the top glass surface of air cavity structure 710. A bottom conductive layer 742 may be formed from a conductive material, such as Cu or others discussed herein, that is plated and patterned on the bottom surface of bottom portion 780. As noted above, it will be appreciated that the bottom portion 780 may be formed of a glass material that is not the same as the photosensitive glass of air cavity structure 710. The top conductive layer 252 and bottom conductive layer 742 may be electrically coupled by a conductive pillar 702, which may be formed as a TGV. It will be appreciated from the foregoing, that in the various aspects disclosed, the air cavity configuration may take various forms and is not limited to the illustrated configurations provided herein.

In order to aid in an understanding of the various aspects of the present disclosure, methods of fabrication are presented. Other methods of fabrication are possible, and discussed fabrication methods are presented only to aid in understanding of the various aspects disclosed herein.

Figure 9A:
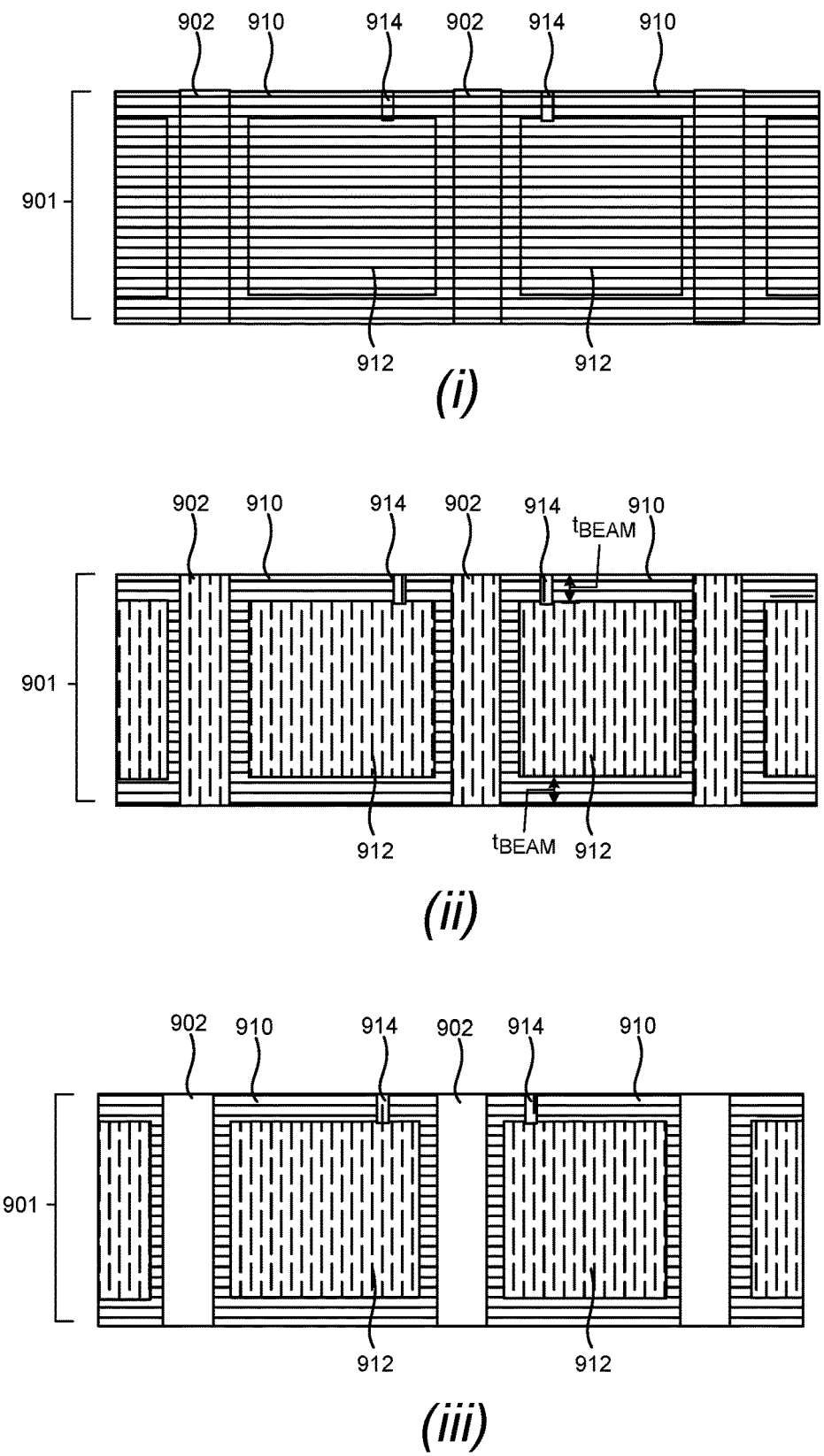

FIGS. 9A-9F illustrate fabrication techniques in accordance with one or more aspects of the disclosure. Referring to FIG. 9A, a portion (i) of the fabrication process begins with providing a photosensitive glass (PSG) substrate 901. The PSG substrate 901 has regions defined for the future components, such as regions associated with the air cavity 912, TGV 902, air cavity structure 910 and etch hole 914. In some aspects one region may define more than one component. For example, the air cavity structure 910 may also be used to define the TGV 902 and air cavity 912. Alternatively, the TGV 902 and air cavity 912 may be used to define the air cavity structure 910.

In portion (ii) of the fabrication process, PSG substrate 901 has some or all of the regions defined for the future components converted to ceramic to allow for eventual material removal. As noted above, UV exposure using laser beam(s) with different focal depths and a thermal bake can cause the affected regions of PSG to be converted to a ceramic for TGV 902 and air cavity 912 and etch hole 914 formations. The remaining unexposed/unconverted PSG portions of PSG substrate 901 may be used to form the air cavity structure 910. The air cavity structure 910 may have top and bottom beam portions that have an equal height/thickness (e.g., $t_{BEAM}$=50 μM to 200 μM) or may have each beam may have a different thickness. The beam height ($t_{BEAM}$) to support the plated conductive layers (e.g. Cu RDL) may vary for the different configurations, such as those discussed above. Additionally, as noted above in some of the open cavity configurations there may only be a top beam or a bottom beam. Likewise, the various cavity structures can easily be defined at the design stage. In at least one aspect, the TGV 902 and air cavity 912 formation regions can be generated with 2 photomasks. Further, the PSG substrate 901 can be converted to ceramic in the desired regions by UV exposure and/or by varying laser beam focal length, such as a femtosecond laser with a proper wavelength.

In portion (iii) of the fabrication process, PSG substrate 901 has the material removed (e.g., etch removal) from TGV 902 regions that were converted to ceramic. It will be appreciated that the converted ceramic materials in the air cavity 912 and etch hole 914 regions through air cavity structure 910 are not removed at this stage.

Referring to FIG. 9B, in portion (iv) of the fabrication process, PSG substrate 901 has the TGV 902 regions filled with conductive material (e.g., Cu) to form TGVs 902 (also referred to herein as conductive pillars). It will be appreciated that the converted ceramic materials in the air cavity 912 and etch hole 914 regions through air cavity structure 910 are not removed at this stage.

In portion (v) of the fabrication process, PSG substrate 901 has a top conductive layer 952 formed over the PSG substrate 901. Portions of the top conductive layer 952 are electrically couple to TGVs 902. The converted ceramic materials in the air cavity 912 and etch hole 914 regions through air cavity structure 910 are not removed at this stage as they provide supporting structure during the formation of the top conductive layer 952. Further, it will be appreciated that the top conductive layer 952 may be patterned for antenna radiation pad formation along with other traces and/or pads.

In portion (vi) of the fabrication process, PSG substrate 901 has a top insulating layer 953 formed over the top conductive layer 952 and any exposed portions of the PSG substrate 901. The top insulating layer 953 provides for passivation and protection of antenna radiation pads and any other structures of the top conductive layer 952. The converted ceramic materials in the air cavity 912 and etch hole 914 regions through air cavity structure 910 are not removed at this stage as they provide supporting structure during the formation of the top insulating layer 953.

Referring to FIG. 9C, in portion (vii) of the fabrication process, PSG substrate 901 has a bottom conductive layer 942 formed over the PSG substrate 901. The AOG device 900 being fabricated may be flipped over to facilitate processing the bottom side portions. It will be appreciated that the portions of the bottom conductive layer 942 are electrically couple to TGVs 902. The converted ceramic materials in the air cavity 912 and etch hole 914 regions through air cavity structure 910 are not removed at this stage as they provide supporting structure during the formation of the bottom conductive layer 942. Further, it will be appreciated that the bottom conductive layer 942 may be patterned to form feedlines along with other traces and/or pads.

In portion (viii) of the fabrication process, PSG substrate 901 has an insulating layer 962 formed over the bottom conductive layer 942 and any exposed portions of the PSG substrate 901. The bottom insulating layer 962 provides for passivation and the bottom conductive layer 942. Additionally, openings are formed for the vias between the bottom conductive layers. The converted ceramic materials in the air cavity 912 and etch hole 914 regions through air cavity structure 910 are not removed at this stage as they provide supporting structure during the formation of the bottom insulating layer 962.

In portion (ix) of the fabrication process, PSG substrate 901 has the vias 943 formed in insulating layer 962. The vias 943 are electrically coupled to the bottom conductive layer 942. The vias may be formed by filling the openings in the bottom insulating layer 962 with a conductive material (e.g., Cu, etc.). It will be appreciated that depending on the thickness desired, the bottom insulating layer 962 and vias 943 maybe formed of one or more layers of materials. The converted ceramic materials in the air cavity 912 and etch hole 914 regions through air cavity structure 910 are not removed at this stage as they provide supporting structure during the formation of the vias 943.

Figure 9D:
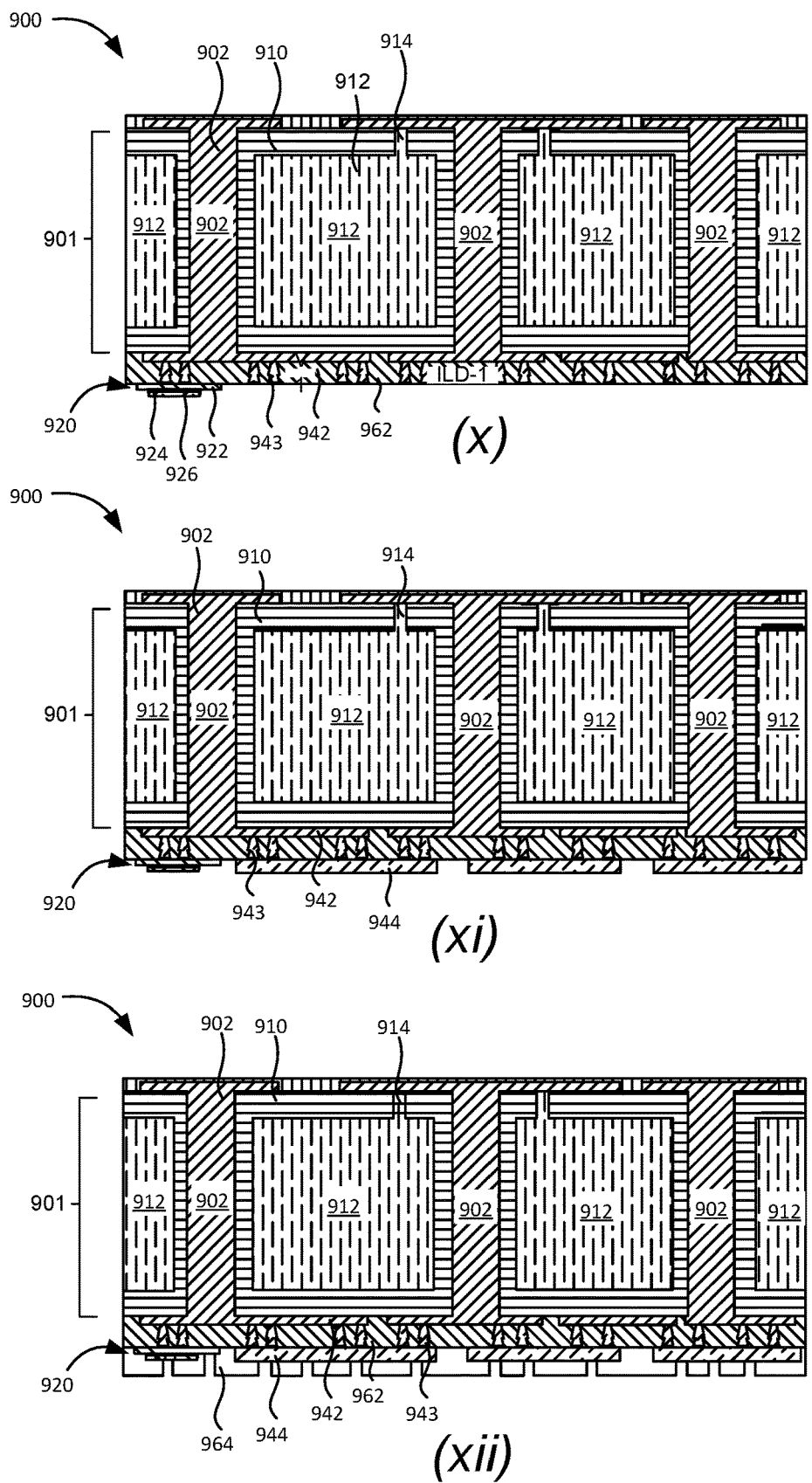

Referring to FIG. 9D, in portion (x) of the fabrication process of the AOG device 900, PSG substrate 901 has a MIM capacitor 920 formed over the insulating layer 962. It will be appreciated that the bottom metal 922 of the MIM capacitor is electrically coupled to portions of the bottom conductive layer 942 using vias 943. It will be appreciated that one or more MIM capacitors 920 may be formed by two metal structures a bottom metal 922 and a top metal 926 with an insulating layer functioning as the dielectric 924, which may be silicon nitride (SiN) or any suitable dielectric material. The bottom metal 922 and top metal may be formed of Cu or other suitable metals. It will be appreciated that the MIM capacitor 920 may be formed in different layers and in alternative aspects disclosed herein, a portion of an existing conductive layer (e.g., bottom conductive layer 942) may serve as one of the top or bottom metals. Accordingly, it will be appreciated that the various aspects disclosed are not limited to the illustrated examples provided herein. The converted ceramic materials in the air cavity 912 and etch hole 914 regions through air cavity structure 910 are not removed at this stage as they provide supporting structure during the formation of the MIM capacitor 920.

In portion (xi) of the fabrication process, a second bottom conductive layer 944 is formed over insulating layer 962 which is formed over the bottom conductive layer 942. Portions of the second bottom conductive layer 944 are electrically coupled to the first vias 943 formed in insulating layer 962. The first vias 943 are electrically coupled to the bottom conductive layer 942, which allows for electrical coupling between the second bottom conductive layer 944 and the bottom conductive layer 942. The converted ceramic materials in the air cavity 912 and etch hole 914 regions through air cavity structure 910 are not removed at this stage as they provide supporting structure during the formation of the second bottom conductive layer 944.

In portion (xii) of the fabrication process of AOG device 900, a second bottom insulating layer 964 is formed over the second bottom conductive layer 944 and MIM capacitor 920. Additionally, openings are formed for the vias to connect the second bottom conductive layer 944 and optionally to the MIM capacitor 920. The converted ceramic materials in the air cavity 912 and etch hole 914 regions through air cavity structure 910 are not removed at this stage as they provide supporting structure during the formation of the bottom insulating layer 962.

Figure 9E:
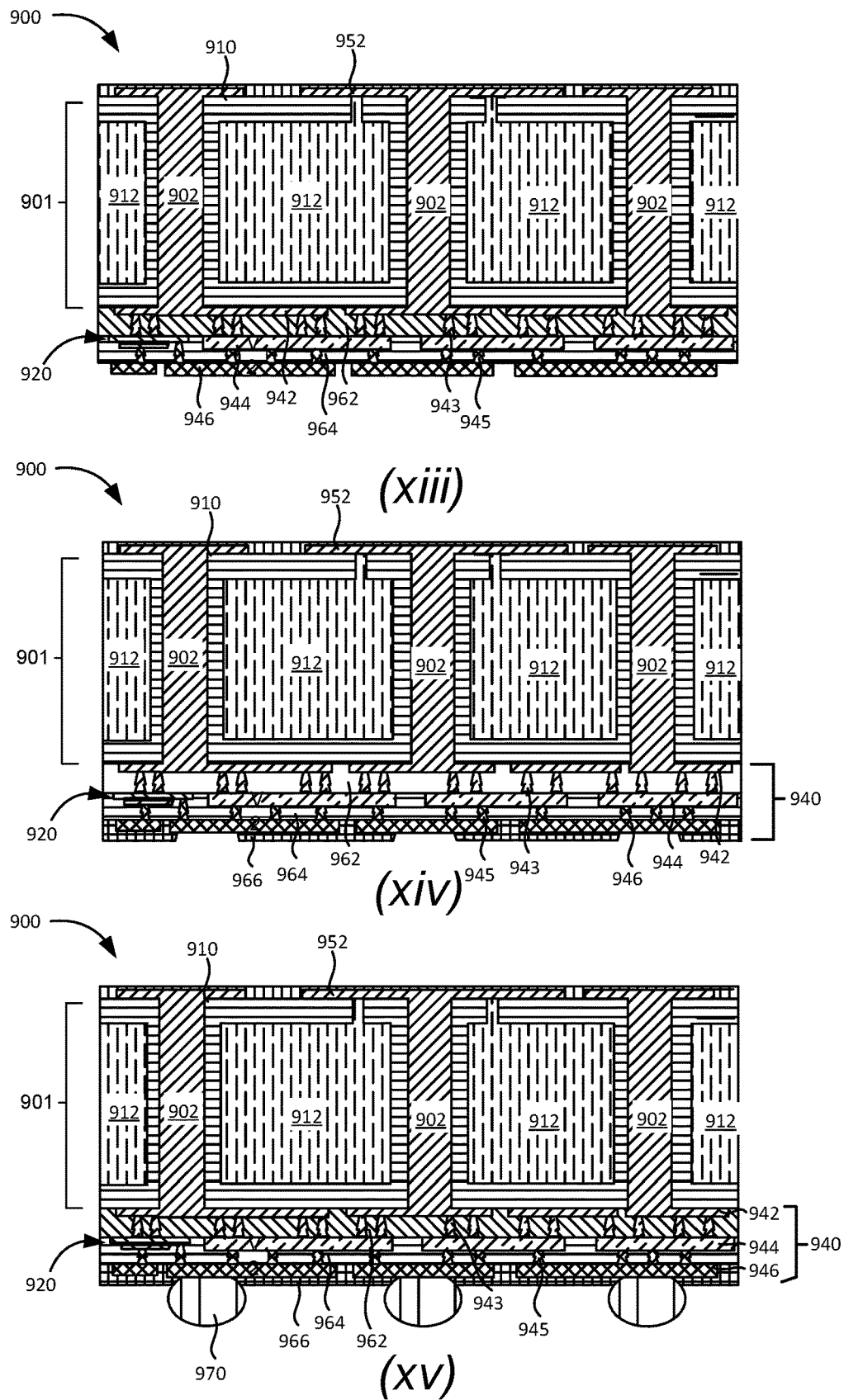

Referring to FIG. 9E, in portion (xiii) of the fabrication process of the AOG device 900, a third bottom conductive layer 946 is formed over second bottom insulating layer 964 which is formed over the second bottom conductive layer 944. Additionally, the second vias 945 are formed by filling the openings in second bottom insulating layer 964, described above. Portions of the third bottom conductive layer 946 are electrically coupled to the second vias 946 formed in second bottom insulating layer 964. The second vias 945 are also electrically coupled to the second bottom conductive layer 944, which allows for electrical coupling between the second bottom conductive layer 944 and the third bottom conductive layer 946. Ultimately the combination of conductive layers 942, 944 and 946 and vias 943 and 945 allow for electrical coupling between the conductive layers 942, 944 and 946 and also to MIM capacitor 920, TGVs 902 and top conductive layer 952. The converted ceramic materials in the air cavity 912 and etch hole 914 regions through air cavity structure 910 are not removed at this stage as they provide supporting structure during the formation of the third bottom conductive layer 946 and second vias 945.

In portion (xiv) of the fabrication process of AOG device 900, a third bottom insulating layer 966 is formed over the third bottom conductive layer 946. Additionally, openings are formed in the third bottom insulating layer to allow electrical coupling to connection structures to connect the third bottom conductive layer 946 to external components. The third bottom insulating layer 966 can provide protection to the third bottom conductive layer 946 during the bumping process (e.g., bond pad opening, etc.). With the addition of the third bottom conductive layer 946, metallization structure 940 is also formed, as it includes conductive layers 942, 944 and 946, vias 943 and 945 and insulating layers 962, 964 and 966. The converted ceramic materials in the air cavity 912 and etch hole 914 regions through air cavity structure 910 are not removed at this stage as they provide supporting structure during the formation of the third bottom insulating layer 962.

In portion (xv) of the fabrication process of AOG device 900, connection structures 970 is formed over the third bottom conductive layer 946 at the previously formed openings. The connection structures 970 may be one or more of a wafer-level package (WLP) ball, a Cu pillar, CU pillar with solder bump, and the like. The connection structures 970 may be formed by a WLP Ball drop process, Cu Pillar bumping process or any suitable process for forming connection structures over openings in the third bottom conductive layer 946 (e.g., bond pad openings). The connection structures 970 may be coupled to the third bottom conductive layer 946 through the filled openings in the third bottom insulating layer 966. The RF signals and optionally other signals and/or power may be conducted from the connection structures 970 through metallization structure 940 using vias 943 and 145 between the conductive layers 942 and 944 and 944 and 946, respectively. The metallization structure 940 also allows for coupling to conductive pillars 902, (e.g., TGVs 902) and top conductive layer 952 and also to MIM capacitor 920. The converted ceramic materials in the air cavity 912 and etch hole 914 regions through air cavity structure 910 are not removed at this stage Referring to FIG. 9F, in portion (xvi) of the fabrication process of the AOG device 900, the etch holes 914 are formed by removing (e.g. etch removal) of the ceramic glass material that was defined and converted in prior fabrication portions (see, e.g., portions (i) and (ii)) from the PSG substrate 901. Any portions of top insulating layer 953 or top conductive layer 952 that overlay the etch holes 914 may also be removed. Alternatively, openings may be formed for the etch holes 914 during the formation of the top conductive layer 952 and/or top insulating layer 953 or at any prior processing stage. Further, it will be appreciated that there will be multiple etch holes 914 formed between top beams of air cavity structures 910 to allow access to the various air cavities 912 regions.

Referring to FIG. 9F, in portion (xvii) of the fabrication process of the AOG device 900, the air cavities 912 are formed by removing (e.g. etch removal) of the ceramic glass material that was defined and converted in prior fabrication portions (see, e.g., portions (i) and (ii)) from the PSG substrate 901. As noted above, it will be appreciated that there will be multiple etch holes 914 formed between top beams of air cavity structures 910 to allow access to the various air cavities 912. The ceramic material is removed from the air cavities using the etch holes 914, and upon removal the air cavities are formed.

Figure 10:
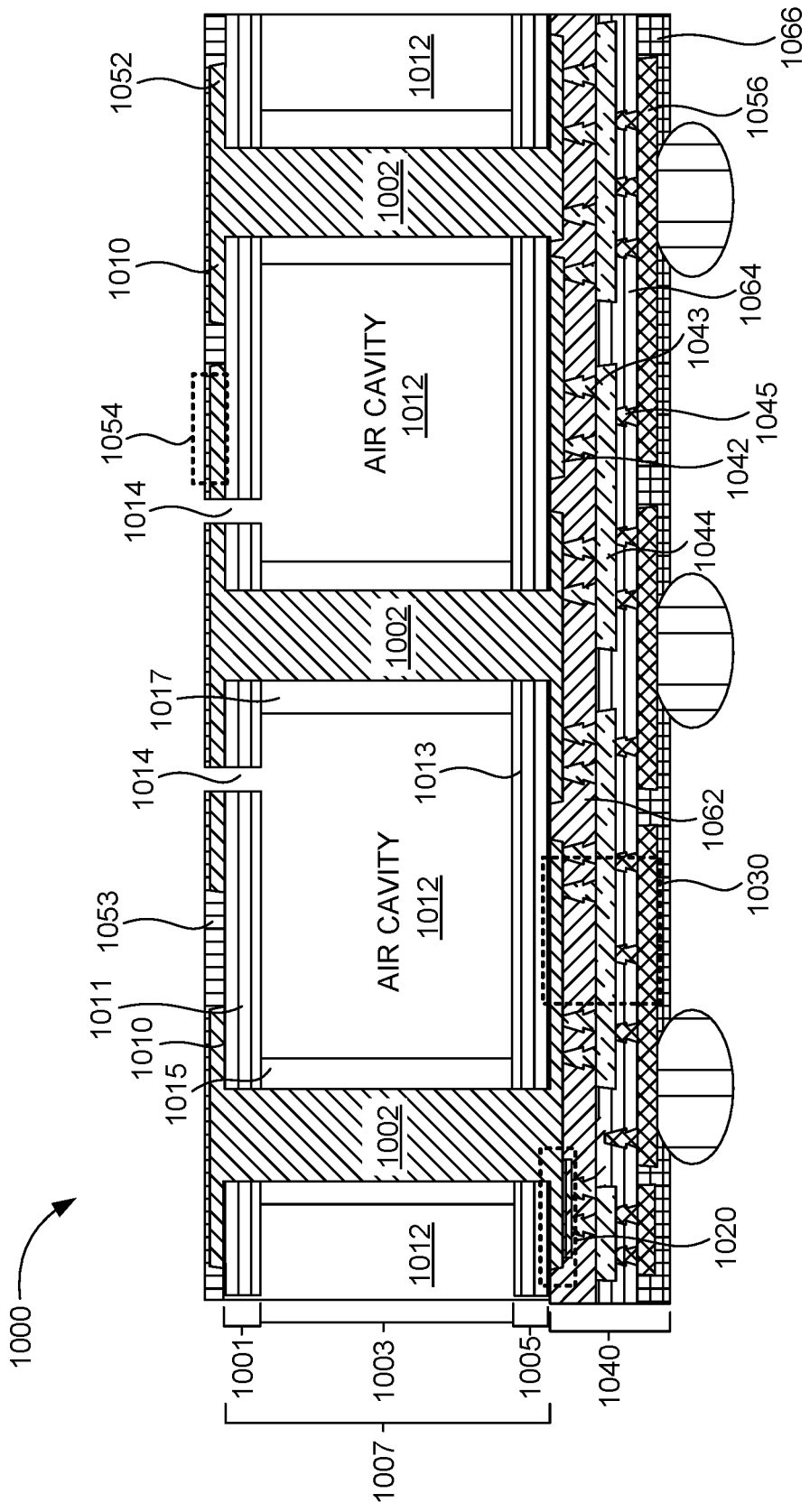
FIG. 10 illustrates another configuration of an antenna on glass device in accordance with at least one aspect of the disclosure.

FIG. 10 illustrates another antenna on glass (AOG) device 1000 in accordance with at least one aspect of the disclosure. The AOG device 1000 includes an air cavity structure 1010 and air cavity 1012 that are at least partially formed from a photosensitive glass substrate 1007, which in this example is formed from a first photosensitive glass substrate 1001 and a second photosensitive glass substrate 1003 and a third photosensitive glass substrate 1005. The air cavity structure 1010 can include a first beam 1011 which can be formed from the first photosensitive glass substrate 1001. Additionally, sidewall 1015 and sidewall 1017 can be formed from the second photosensitive glass substrate 1002. The sidewalls 1015 and 1017 may be disposed from the first beam 1011 and be substantially perpendicular to the first beam 1011. The air cavity structure 1010 can include a second beam 1013. The second beam may be formed from a third photosensitive glass substrate. The sidewalls 1015 and 1017 may be disposed between the first beam 1011 and the second beam 1013. It will be appreciated that sidewalls 1015 and 1017 may form part of a continuous sidewall in 3 dimensions. For example, if the air cavity has a general shape of a cube, the sidewall would form four sides of the cube while the top beam 1011 and the bottom beam 1013 would define the top and bottom of the cube structure forming the air cavity 1012, respectively. It will be appreciated that the various aspects disclosed herein are not limited to a specific geometric shape or the various illustrated aspects provided, which are provided merely to aid in the explanation of various aspects disclosed herein.

The first photosensitive glass substrate 1001 and the second photosensitive glass substrate 1003 may each have a different optical bandgap (by ion doping, such as cerium (Ce), silver (Ag), sodium (Na), fluorine (F), etc.). For example, the first photosensitive glass substrate 1001 may have a wide optical bandgap and the second photosensitive glass substrate 1003 may have a narrow optical bandgap. For example, the optical bandgap of the PSG can range from 2.5 electronvolts (eV) to 5.5 eV. Accordingly, in some aspects, the wide bandgap can have a value towards the top of the range (e.g., 5.5 eV) and narrow bandgap can have a value towards the bottom of the ranged (e.g., 2.5 eV). Further, in some aspects disclosed herein, the third photosensitive glass substrate 1005 and the first photosensitive glass substrate 1001 may each have the same optical bandgap.

The AOG device 1000 allows for the integration of one or more metal-insulator-metal (MIM) capacitors 1020 and/or inductors 1030 into the AOG device 1000 for RF filtering and/or impedance matching for high frequency applications, such as 5G mmWave frequencies. The air cavity 1012 has an improved permittivity (Dk) and loss tangent (Df) over conventional designs, since for air (Dk=1, Df=0). The air cavity 1012 can be formed by removing a portion of the second photosensitive glass substrate 1003. The second photosensitive glass substrate 1003 is also used to form the air cavity structure 1010, as discussed above. The air cavity 1012 may be formed by converting the exposed glass region to ceramic and then removing the converted ceramic out through the etch holes 1014. The AOG device 1000 may also include a top conductive layer 1052 and top insulating layer 1053. The top conductive layer 1052 may be formed from conductive materials, such as Cu that is plated and patterned on the glass of air cavity structure 1010. A portion of the top conductive layer 1052 may be patterned to form antenna(s) 1054, which may be patch antennas or the like. The antenna(s) 1054 along with the top conductive layer 1052 may be covered by the top insulating layer 1053 for passivation and protection of the antenna(s) 1054. The top conductive layer 1052 and antennas 1054 may be copper (Cu), or other conductive materials with high conductivity such as silver (Ag), gold (Au), aluminum (Al) and other like materials, alloys or combination of materials. The top insulating layer 1053 may be in interlayer dielectric (ILD) layer. The ILD layer 1053 may be formed of materials such as doped silicon dioxide ($SiO_2$), or its fluorine-doped, carbon-doped, and carbon-doped forms, as well as spin-on organic polymeric dielectrics such as polyimide (PI), polynorbornenes, benzocyclobutene (BCB), polytetrafluoroethylene (PTFE) and/or silicone based polymeric dielectrics.

The AOG device 1000 also includes features such as through-glass vias (TGV)/conductive pillars (e.g., Cu), referred to herein as TGVs 1002. The MIM capacitor(s) 1020 may be formed at least in part from a portion of the metallization structure 1040. Likewise, the inductor(s) 1030 may be formed at least in part from a portion of the metallization structure 1040. The MIM capacitor(s) 1020 and inductor(s) 1030 may be used for RF filtering and impedance matching. The metallization structure 1040 may be formed from a plurality of conductive layers and insulating layers. For example, conductive layers 1042, 1044 and 1046 may be copper (Cu), or other conductive materials with high conductivity such as silver (Ag), gold (Au), aluminum (Al) and other like materials, alloys or combination of materials. The insulating layers may be formed as interlayer dielectric (ILD) layers 1062, 1064 and 1066. The ILD layers 1062, 1064 and 1066 may be formed of materials such as doped silicon dioxide ($SiO_2$), or its fluorine-doped, carbon-doped, and carbon-doped forms, as well as spin-on organic polymeric dielectrics such as polyimide (PI), polynorbornenes, benzocyclobutene (BCB), polytetrafluoroethylene (PTFE) and/or silicone based polymeric dielectrics.

The AOG device 1000 may also include one or more connection structures 1070 that facilitate electrical and/or mechanical coupling of the AOG device 1000 to external circuits/devices. In some aspects the connection structures 1070 may be one or more of a wafer-level package (WLP) ball, a Cu pillar, CU pillar with solder bump, and the like. The connection structures 1070 may be coupled to the conductive layer 1046 through openings in the insulating layer 1066. The RF signals and optionally other signals and/or power may be conducted from the connection structures 1070 through metallization structure 1040 using via 1045 between the conductive layers 1046 and 1044, and via 1043 between the conductive layer 1044 and bottom conductive layer 1042, then coupling to conductive pillars 1002, such as, through-glass vias (TGVs), Cu pillars and the like, which may also be referred to herein as TGVs 1002. The conductive pillars 1002 are electrically coupled to the top conductive layer 1052, which may include one or more antenna(s) 1054. The MIM capacitor(s) 1020 may be formed at least in part from a portion of the metallization structure 1040. Likewise, the inductor(s) 1030 may be formed at least in part from a portion of the metallization structure 1040 and may be a planar inductor (e.g., 2 dimensional (2D) spiral inductor), 2.5D inductor or 3D inductor, formed on one or more conductive layers of the metallization structure 1040. The MIM capacitor(s) 1020 and inductor(s) 1030 may be used for RF filtering and impedance matching. The metallization structure 1040 may be formed from a plurality of conductive layers and insulating layers.

Figure 11:
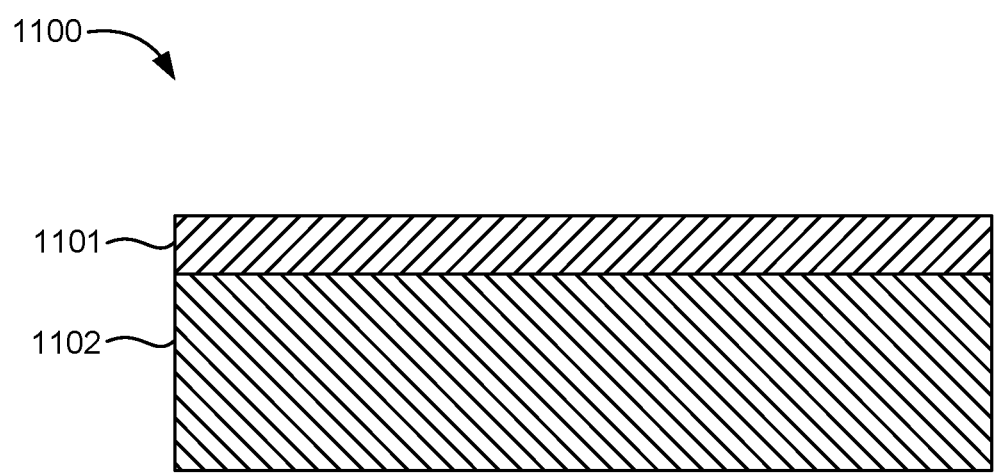
FIG. 11 illustrates an alternative substrate portion of the antenna on glass device in accordance with at least one aspect of the disclosure.

FIG. 11 illustrates an alternative substrate structure of an AOG device 1100 according to at least one aspect of the disclosure. In the illustrated configuration, the photosensitive glass substrate structure is formed from a first photosensitive glass substrate 1101 and a second photosensitive glass substrate 1102. In this configuration, the optional third photosensitive glass substrate, discussed above is not provided. The first photosensitive glass substrate 1101 and the second photosensitive glass substrate 1102 may each have a different optical bandgap. For example, the first photosensitive glass substrate 1101 may have a wide optical bandgap and the second photosensitive glass substrate 1102 may have a narrow optical bandgap. It will be appreciated that this structure may be used for the open air cavity designs discussed above (see, e.g., AOG devices 400, AOG device 500, and AOG device 700). Since in the open air cavity designs, one end of the air cavity is open, the first photosensitive glass substrate 1101 (which may be on the top or bottom depending on the orientation) may form a beam and the second photosensitive glass substrate 1102 may form the sidewalls of the air cavity with the end opposite the beam being open, as discussed above. The impact of the different glass substrates with different optical bandgaps on the fabrication process will be discussed below.

In order to fully illustrate aspects of the present disclosure, methods of fabrication are presented. Other methods of fabrication are possible, and the discussed fabrication methods are presented only to aid in understanding of the concepts disclosed herein.

Figure 12A:
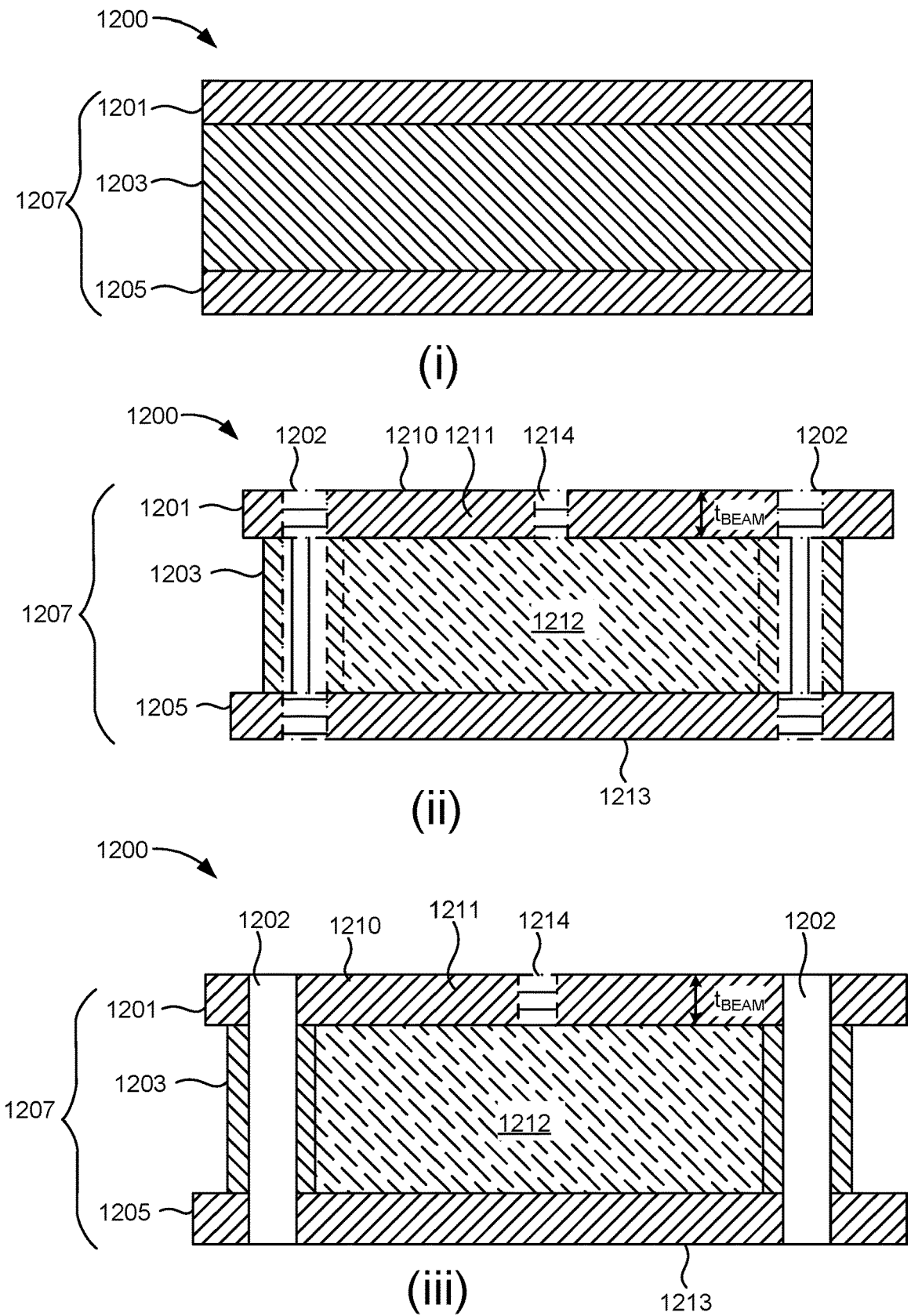

FIGS. 12A and 12B illustrate fabrication techniques for AOG devices in accordance with one or more aspects of the disclosure. Referring to FIG. 12A, a portion (i) of the fabrication process of an AOG device 1200 (e.g., which may be similar to AOG device 1000) begins with providing a photosensitive glass (PSG) substrate 1207 including a first photosensitive glass substrate 1201 and the second photosensitive glass substrate 1203 each having a different optical bandgap. For example, the first photosensitive glass substrate 1201 may have a wide optical bandgap and the second photosensitive glass substrate 1203 may have a narrow optical bandgap. A third photosensitive glass substrate 1205 is also provided that in some examples has the same optical bandgap (e.g. wide optical bandgap) as the first photosensitive glass substrate 1201. For simplicity, in the following description, the combined first, second and third PSG substrates may be referred to as PSG substrate 1207, when each substrate is impacted.

In portion (ii) of the fabrication process of AOG device 1200, PSG substrate 1207 has regions defined for the future components, such as regions associated with the air cavity 1212, TGV 1202, air cavity structure 1210 and etch hole 1214. In some aspects one region may define more than one component. For example, the air cavity structure 1210 may also be used to define the TGV 1202 and air cavity 1212. Alternatively, the TGV 1202 and air cavity 1212 may be used to define the air cavity structure 1210. Additionally, it will be appreciated that some of the regions defined for the future components may be defined in one or more PSG substrates 1201, 1203 and/or 1205. For example, the TGV 1202 has a region defined through each of PSG substrates 1201, 1203 and/or 1205. The PSG substrate 1207 has some or all of the regions defined for the future components converted to ceramic to allow for eventual material removal. For example, shorter wavelength UV exposure (e.g., using laser beam(s) with different focal depths) and a thermal bake can cause the affected TGV 1202 regions of PSG 1207 to be converted to a ceramic for TGV 1202 and etch hole 1214 formations. However, since the air cavity 1212 is primarily formed from removal of material from the second PSG substrate 1203, which has a narrow bandgap, the air cavity 1212 may be defined by exposure of longer wavelength UV light. The remaining unexposed/unconverted PSG portions of PSG substrate 1207 may be used to form the air cavity structure 1210. The air cavity structure 1210 may have top beam 1211 and bottom beam 1213 portions that have an equal height/thickness (e.g., $t_{BEAM}$=50 µM to 200 µm) or may have each beam may have a different height/thickness. Additionally, the top beam is formed from the first PSG substrate 1201 and the bottom beam 1213 is formed from the third PSG substrate 1205. The beam height ($t_{BEAM}$) to support the plated conductive layers (e.g. Cu RDL) may vary for the different configurations, such as those discussed above. Additionally, as noted above in some of the open air cavity configurations there may only be a top beam or a bottom beam. Likewise, the various cavity structures disclosed herein can be defined at the design stage.

In portion (iii) of the fabrication process of AOG device 1200, PSG substrate 1207 has the material removed (e.g., etch removal) from TGV 1202 regions that were converted to ceramic. Specifically, material is removed from each of PSG substrates 1201, 1203 and 1205. It will be appreciated that the converted ceramic materials in the air cavity 1212 and etch hole 1214 regions through air cavity structure 1210 are not removed at this stage.

Referring to FIG. 12B, in portion (iv) of the fabrication process of AOG device 1200, PSG substrate 1207 has the TGV 1202 regions filled with conductive material (e.g., Cu) to form TGVs 1202 (also referred to herein as conductive pillars). Additionally, a top conductive layer 1252 is formed over the first PSG substrate 1201/top beam 1211. Portions of the top conductive layer 1252 are electrically couple to TGVs 1202. The converted ceramic materials in the air cavity 1212 or etch hole 1214 regions through air cavity structure 1210 are not removed at this stage as they provide supporting structure during the formation of the top conductive layer 1252. Further, it will be appreciated that the top conductive layer 1252 may be patterned for antenna radiation pad formation along with other traces and/or pads. However, the converted ceramic materials in the etch hole 1214 region may be removed after the formation of the top conductive layer 1252. Additionally, a bottom conductive layer 1242 may be formed over the third PSG substrate 1205/bottom beam 1213. The AOG device 1200 during this portion of fabrication, may be flipped over to facilitate processing the bottom side portions. It will be appreciated that the portions of the bottom conductive layer 1242 are electrically couple to TGVs 1202. The converted ceramic materials in the air cavity 1212 region in the second PSG substrate 1203 are not removed at this stage as it provides supporting structure during the formation of the bottom conductive layer 1242. Further, it will be appreciated that the bottom conductive layer 1242 may be patterned to form feedlines along with other traces and/or pads.

In portion (v) of the fabrication process of AOG device 1200, PSG substrate 1207, specifically the second PSG substrate 1203 has the air cavity 1212 formed by removing (e.g. etch removal by hydrofluoric (HF) acid) the ceramic glass material from the second PSG substrate 1203. As noted above, it will be appreciated that there may be multiple etch holes 1214 formed between top beam 1211 of air cavity structure 1210 and the air cavity 1212 to allow various access openings to the air cavity 1212. The ceramic material is removed from the air cavity 1212 using the etch hole(s) 1214, and upon removal the air cavity 1212 is formed.

It will be appreciated that the partial fabrication portions discussed above in relation to FIG. 12A and FIG. 12B were summarized to provide an illustration of the process with the different PSG substrate when compared to the fabrication portions discussed in relation to FIGS. 9A-9F, which discloses an AOG device 900. Accordingly, details provided in other portions of the disclosure and that are common (e.g. via, metallization structure formation, application of insulating layers, etc.) are not repeated in the foregoing description of FIGS. 12A and 12B.

The AOG device 900 is a hollow air cavity structure fabricated from a photosensitive glass (PSG) substrate. The air cavity formation can be made by using UV laser with variable focal depth, or using femtosecond laser that can scan the PSG to convert the specific region to ceramic and then etch removal by HF acid to form air cavity. Although the AOG device 900 is a high performance antenna with improved gain over a bare glass substrate, the air cavity formation by laser scan across the AOG with large cavity can be a slow process.

In the alternative configurations of AOG devices 1000, 1100 and 1200 the air cavity and TGV structure are formed by a hetero-junction PSG (HJ-PSG) with different optical bandgaps, as discussed above. By using the HJ-PSG substrate configuration (e.g., wide optical bandgap (WBG)/narrow optical bandgap (NBG) or WBG/NBG/WBG), the air cavity structure can be formed using high throughput manufacturing methods (e.g., by photo-lithography using UV-light sources with different wavelengths.

It will be appreciated that the foregoing fabrication processes and related discussion were provided merely as a general illustration of some of the aspects of the disclosure and is not intended to limit the disclosure or accompanying claims. Further, many details in the fabrication process known to those skilled in the art may have been omitted or combined in summary process portions to facilitate an understanding of the various aspects disclosed without a detailed rendition of each detail and/or all possible process variations. Further, it will be appreciated that the illustrated configurations and descriptions are provided merely to aid in the explanation of the various aspects disclosed herein. For example, the number and location of the MIM capacitors and/or inductors, the metallization structure may have more or less conductive and insulating layers, the cavity orientation, size, whether it is formed of multiple cavities, is closed or open, and other aspects may have variations driven by specific application design features, such as the number of antennas, antenna type, frequency range, power, etc. Accordingly, the forgoing illustrative examples and associated figures should not be construed to limit the various aspects disclosed and claimed herein.

In accordance with the various aspects disclosed herein, at least one aspect includes an antenna on glass (AOG) device (e.g., 100, 400, 500, 600, 700, 900, 1000, 1100, 1200) having an air cavity (e.g., 112, 212, 412, 512, 712, 912, 1012, 1212) at least partially formed in a photosensitive glass substrate (e.g., 101, 901, 1207). An air cavity structure is at least partially encloses the air cavity and wherein the air cavity structure (e.g., 110, 210, 410, 510, 710, 910, 1010, 1210) at least partially formed from the photosensitive glass substrate. An antenna (e.g., 154, 754, 1054) is formed from portion of a top conductive layer (e.g., 152, 252, 452, 552, 752, 952, 1052) disposed on a top surface of the air cavity structure and at least partially overlapping the air cavity. A metallization structure (e.g., 140, 740, 940) is provided having a bottom conductive layer (e.g., 142, 242, 642, 742, 942) disposed on a bottom surface of the air cavity structure, wherein the bottom conductive layer is electrically coupled to the top metal layer by a conductive pillar (e.g., 102, 202, 702, 902) disposed through the photosensitive glass substrate. Among the various technical advantages the various aspects disclosed provide, in at least some aspects, air cavity provided in the photosensitive glass substrate allows for improved antenna performance by providing low Dk/Df glass platform that may also include integrated MIM capacitors and inductors to provide on-package RF filtering and impedance matching, which is not available in conventional designs.

Further, one or more aspects disclosed herein provide for a high performance antenna using a low Dk/Df glass platform (wafer/panel) and established processing techniques. The photosensitive glass has a Df of 0.0002, the air cavity has a Df of 0.0. Using the MIM Capacitor and inductor integration, it is feasible for antenna matching and filtering to reduce spurious emissions and to meet mmWave design specifications, where high-Q filtering is desirable at the antenna package, which can be provided by the various aspects disclosed herein.

Additionally, one or more aspects disclosed herein provide for improved performance over conventional designs. For example, antenna gain can be improved over conventional designs by 0.3 to 0.5 dB. Substrate trace loss can be improved over conventional designs by 0.3 to 0.5 dB. Antenna filtering can be improved over conventional designs by 0.5 dB. The overall system performance (e.g., gain+trace+filtering) is improved by about 1.0 to 1.5 dB.

Figure 13:
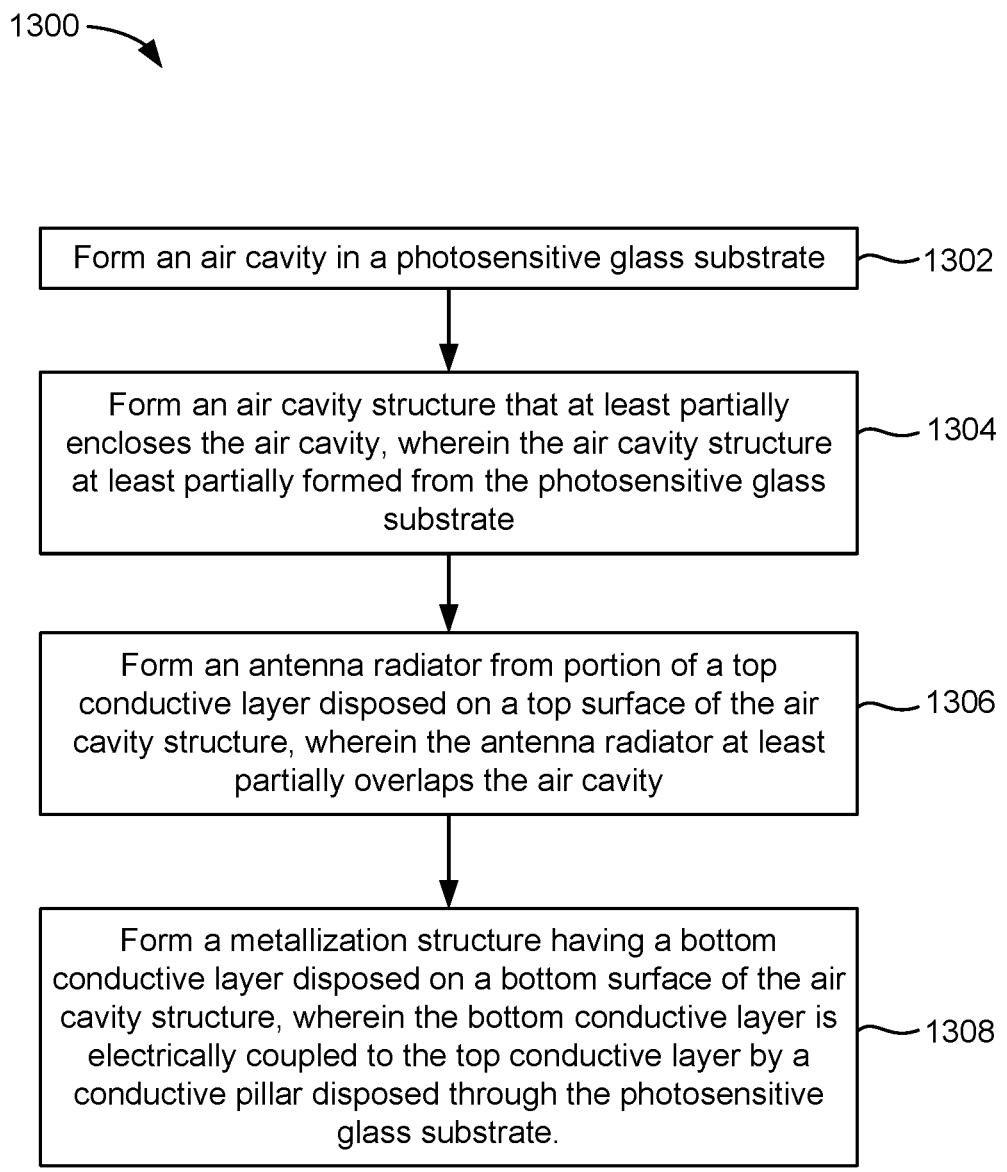
FIG. 13 illustrates a flowchart of a method for manufacturing an antenna on glass device in accordance at least one aspect of the disclosure.

It will be appreciated from the foregoing that there are various methods for fabricating AOG devices are disclosed herein. FIG. 13 illustrates a flowchart of a method 1300 for fabricating an antenna on glass (AOG) device. The method may include in block 1302 forming an air cavity in a photosensitive glass substrate. In block 1304, the method continues with forming an air cavity structure that at least partially encloses the air cavity, where the air cavity structure at least partially formed from the photosensitive glass substrate. In block 1306, the method continues with forming an antenna from portion of a top conductive layer disposed on a top surface of the air cavity structure, where the antenna at least partially overlaps the air cavity. In block 1308, the method continues with forming a metallization structure having a bottom conductive layer disposed on a bottom surface of the air cavity structure, where the bottom conductive layer is electrically coupled to the top conductive layer by a conductive pillar disposed through the photosensitive glass substrate.

Accordingly, it will be appreciated from the foregoing disclosure that additional processes for fabricating the various aspects disclosed herein will be apparent to those skilled in the art and a literal rendition of the processes discussed above will not be provided or illustrated in the included drawings.

Figure 14:
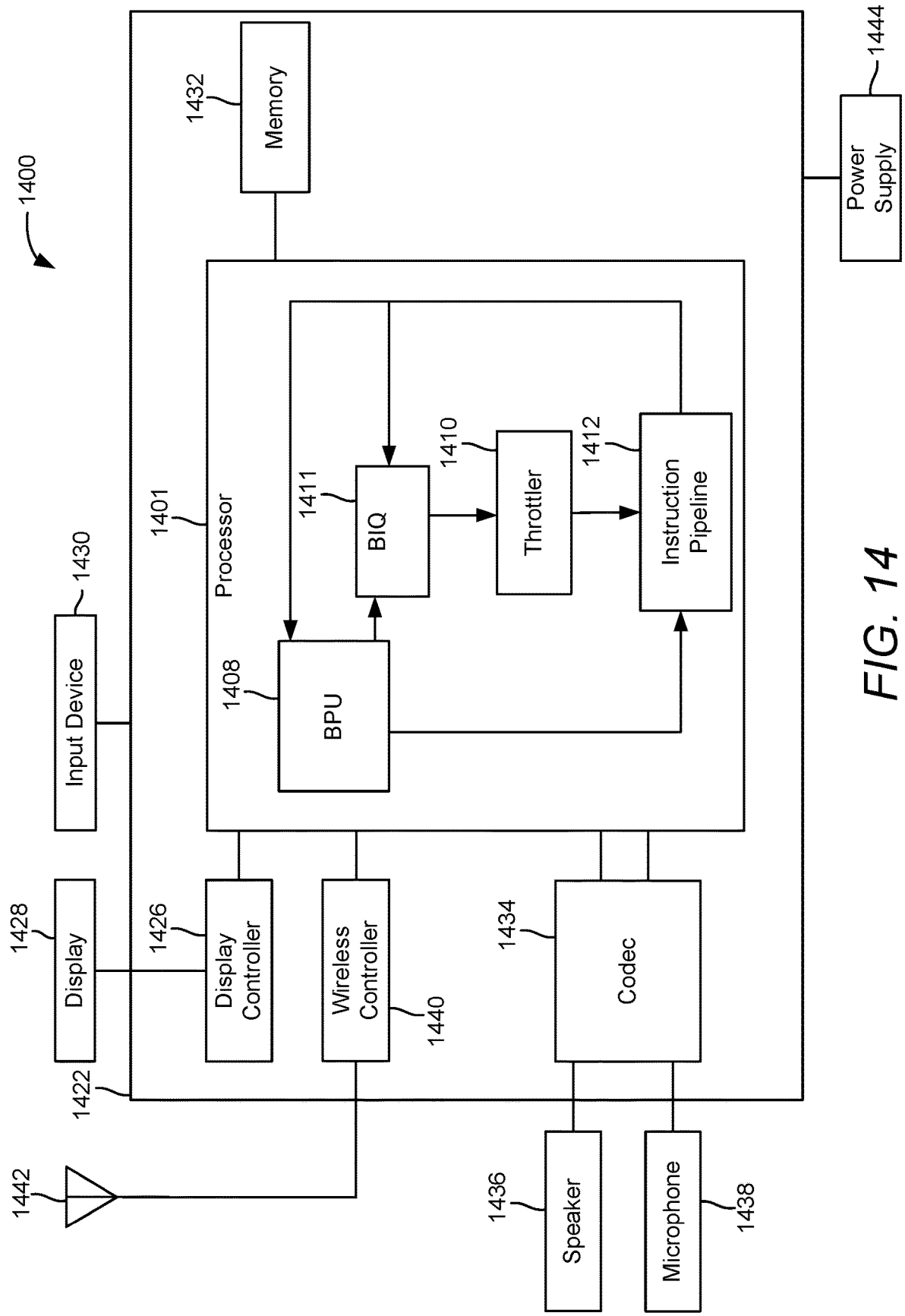
FIG. 14 illustrates an exemplary mobile device in accordance at least one aspect of the disclosure.

FIG. 14 illustrates an exemplary mobile device in accordance with some examples of the disclosure. Referring now to FIG. 14, a block diagram of a mobile device that is configured according to exemplary aspects is depicted and generally designated mobile device 1400. In some aspects, mobile device 1400 may be configured as a wireless communication device. As shown, mobile device 1400 includes processor 1401. Processor 1401 is shown to comprise instruction pipeline 1412, buffer processing unit (BPU) 1408, branch instruction queue (BIQ) 1411, and throttler 1410 as is well known in the art. Other well-known details (e.g., counters, entries, confidence fields, weighted sum, comparator, etc.) of these blocks have been omitted from this view of processor 1401 for the sake of clarity. Processor 1401 may be communicatively coupled to memory 1432 over a link, which may be a die-to-die or chip-to-chip link. Mobile device 1400 also includes display 1428 and display controller 1426, with display controller 1426 coupled to processor 1401 and to display 1428.

In some aspects, FIG. 14 may include coder/decoder (CODEC) 1434 (e.g., an audio and/or voice CODEC) coupled to processor 1401; speaker 1436 and microphone 1438 coupled to CODEC 1434; and wireless circuits 1440 (which may include a modem, RF circuitry, filters, etc.) coupled to antenna 1442 and to processor 1401. The antenna 1442 may be one or more antenna on glass devices as disclosed herein or may be otherwise configured to take advantage of the various aspects disclosed herein.

In a particular aspect, where one or more of the above-mentioned blocks are present, processor 1401, display controller 1426, memory 1432, CODEC 1234, and wireless circuits 1440 can be included in a system-in-package or system-on-chip device 1422 which may be implemented in whole or part using the flip-chip techniques. Input device 1430 (e.g., physical or virtual keyboard), power supply 1444 (e.g., battery), display 1428, input device 1430, speaker 1436, microphone 1438, antenna 1442, and power supply 1444 may be external to system-on-chip device 1422 and may be coupled to a component of system-on-chip device 1422, such as an interface or a controller.

It should be noted that although FIG. 14 depicts a mobile device, the various illustrated components may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 15:
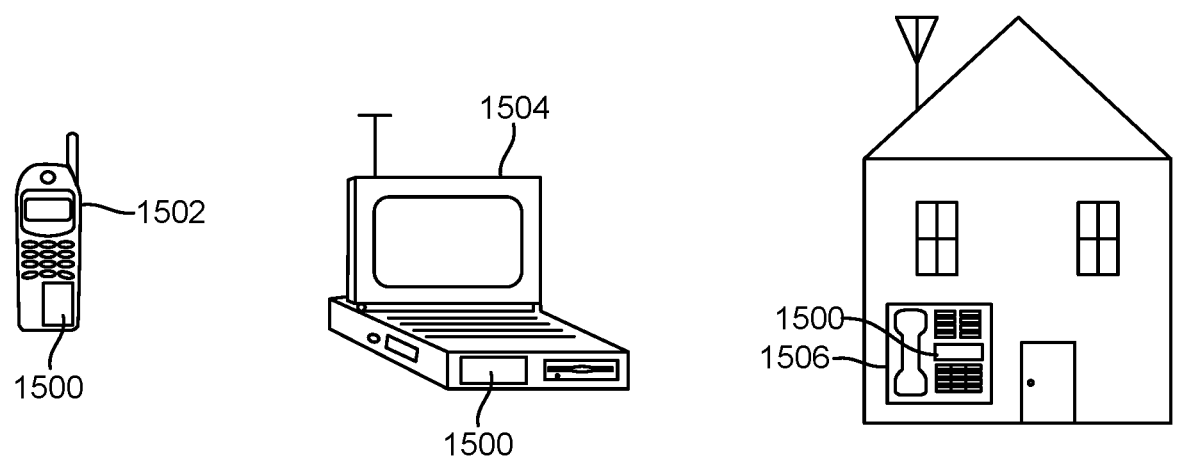
FIG. 15 illustrates various electronic devices which may utilize one or more aspects of the disclosure.

FIG. 15 illustrates various electronic devices that may be integrated with any of the aforementioned antenna on glass devices in accordance with various aspects of the disclosure. For example, a mobile phone device 1502, a laptop computer device 1504, and a fixed location terminal device 1506 may each be consider generally user equipment (UE) and may include an antenna on glass device 1500 as described herein. The devices 1502, 1504, 1506 illustrated in FIG. 15 are merely exemplary. Other electronic devices may also include the antenna on glass device 1500 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), an Internet of things (IoT) device or any other device that stores or retrieves data or computer instructions or any combination thereof.

The foregoing disclosed devices and functionalities may be designed and configured into computer files (e.g., RTL, GDSII, GERBER, etc.) stored on computer-readable media. Some or all such files may be provided to fabrication handlers who fabricate devices based on such files. Resulting products may include semiconductor wafers that are then cut into semiconductor die and packaged into an antenna on glass device. The antenna on glass device may then be employed in devices described herein.

The following provides an overview of examples of the present disclosure:

EXAMPLE 1

An antenna on glass device including: an air cavity at least partially formed in a photosensitive glass substrate. The antenna also includes an air cavity structure that at least partially encloses the air cavity, where the air cavity structure at least partially formed from the photosensitive glass substrate. The antenna also includes an antenna formed from portion of a top conductive layer disposed on a top surface of the air cavity structure, where the antenna at least partially overlaps the air cavity. The antenna also includes a metallization structure having a bottom conductive layer disposed on a bottom surface of the air cavity structure, where the bottom conductive layer is electrically coupled to the top conductive layer by a conductive pillar disposed through the photosensitive glass substrate.

EXAMPLE 2

The antenna on glass device of example 1, further including: an etch hole that extends to the air cavity through a portion of the air cavity structure.

EXAMPLE 3

The antenna on glass device of example 2, wherein the portion is on a top beam of the air cavity structure.

EXAMPLE 4

The antenna on glass device of examples 1 through 3, further including a top insulating layer, wherein the top insulating layer disposed over the top conductive layer.

EXAMPLE 5

The antenna on glass device of example 4, wherein the top insulating layer is formed from at least one of silicon dioxide ($SiO_2$), an organic polymeric dielectric, polyimide (PI), polynorbornene, benzocyclobutene (BCB), polytetrafluoroethylene (PTFE) or silicone based polymeric dielectrics.

EXAMPLE 6

The antenna on glass device of examples 1 through 5, wherein the top conductive layer and the bottom conductive layer may each be formed of at least one of copper (Cu), silver (Ag), gold (Au), aluminum (Al), tungsten (W), nickel (Ni), or combinations thereof.

EXAMPLE 7

The antenna on glass device of examples 1 through 6, wherein the conductive pillar is a through-glass vias (TGV).

EXAMPLE 8

The antenna on glass device of examples 1 through 7, further including a metal-insulator-metal (MIM) capacitor.

EXAMPLE 9

The antenna on glass device of example 8, wherein the MIM capacitor is formed using at least one conductive layer in the metallization structure.

EXAMPLE 10

The antenna on glass device of example 9, wherein the MIM capacitor is formed using at the bottom conductive layer of the metallization structure.

EXAMPLE 11

The antenna on glass device of example 8, further including an inductor.

EXAMPLE 12

The antenna on glass device of example 11, wherein the inductor is formed using at least one conductive layer in the metallization structure.

EXAMPLE 13

The antenna on glass device of example 12, wherein the inductor is one of a planar inductor, 2.5 Dimension (2.5 D) inductor or 3D inductor.

EXAMPLE 14

The antenna on glass device of example 11, wherein the MIM capacitor and the inductor are configured to be at least one of a filter or impedance matching circuit.

EXAMPLE 15

The antenna on glass device of examples 1 through 14, wherein the air cavity structure substantially encloses the air cavity.

EXAMPLE 16

The antenna on glass device of examples 1 through 15, wherein the air cavity structure is formed from a plurality of air cavities and each air cavity is internally connected by one or more cavity vents.

EXAMPLE 17

The antenna on glass device of examples 1 through 14, wherein the air cavity structure has an open side.

EXAMPLE 18

The antenna on glass device of example 17, wherein the open side is a top side of the air cavity structure and a beam is formed substantially vertical in the air cavity to help support the top conductive layer.

EXAMPLE 19

The antenna on glass device of example 17, wherein the open side is a bottom side of the air cavity structure.

EXAMPLE 20

The antenna on glass device of example 19, further including a bottom portion of the air cavity structure, wherein the bottom portion a second glass material.

EXAMPLE 21

The antenna on glass device of example 20, further including a bonding layer, wherein the bonding is disposed between the photosensitive glass substrate and the second glass material forming the bottom portion of the air cavity structure.

EXAMPLE 22

The antenna on glass device of example 20, wherein the photosensitive glass substrate and the second glass material have different permittivity (Dk) and loss tangent (Df) values.

EXAMPLE 23

The antenna on glass device of example 20, wherein the conductive pillar extends through the second glass material forming the bottom portion of the air cavity structure.

EXAMPLE 24

The antenna on glass device of example 20, wherein the bottom conductive layer is formed on a bottom surface of the bottom portion of the air cavity structure.

EXAMPLE 25

The antenna on glass device of examples 1 through 16, further including a top beam of the air cavity structure, wherein the top beam is formed from a second material and the air cavity structure substantially encloses the air cavity.

EXAMPLE 26

The antenna on glass device of example 25, wherein the second material forming the top beam is a low Dk and Df dielectric material.

EXAMPLE 27

The antenna on glass device of example 25, wherein the second material is at least one of silicon dioxide ($SiO_2$) or benzocyclobutene (BCB).

EXAMPLE 28

The antenna on glass device of examples 1 through 27, further including a plurality of connection structures configured to electrically couple the metallization structure to one or more components that are external to the antenna on glass device.

EXAMPLE 29

The antenna on glass device of example 28, further including a plurality of connection structures configured to electrically couple the metallization structure to one or more components that are external to the antenna on glass device.

EXAMPLE 30

The antenna on glass device of examples 1 through 29, wherein the antenna on glass is incorporated into an apparatus selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

EXAMPLE 31

The antenna on glass device of examples 1 through 16, wherein the photosensitive glass substrate includes: a first photosensitive glass substrate; and a second photosensitive glass substrate.

EXAMPLE 32

The antenna on glass device of example 31, wherein air cavity structure includes:
 a first beam formed from the first photosensitive glass substrate; and a sidewall formed from the second photosensitive glass substrate, wherein the sidewall is disposed from the first beam.

EXAMPLE 33

The antenna on glass device of example 32, wherein air cavity structure includes:
 a second beam, wherein the sidewall is disposed between the first beam and the second beam.

EXAMPLE 34

The antenna on glass device of example 33, wherein the second beam, is formed from a third photosensitive glass substrate.

EXAMPLE 35

The antenna on glass device of examples 31 through 34, wherein the first photosensitive glass substrate and the second photosensitive glass substrate each have a different optical bandgap.

EXAMPLE 36

The antenna on glass device of example 35, wherein the first photosensitive glass substrate has a wide optical bandgap and the second photosensitive glass substrate has a narrow optical bandgap.

EXAMPLE 37

The antenna on glass device of example 36, wherein the first photosensitive glass substrate has an optical bandgap of 5.5 electronvolts (eV) and the second photosensitive glass substrate of 2.5 eV.

EXAMPLE 38

The antenna on glass device of example 31, wherein air cavity structure further includes: a third photosensitive glass substrate, wherein the first photosensitive glass substrate and the third photosensitive glass substrate each have the same optical bandgap.

EXAMPLE 39

The antenna on glass device of examples 31 through 38, wherein the air cavity structure has an open side.

EXAMPLE 40

The antenna on glass device of example 38, wherein the open side is a top side of the air cavity structure and a beam is formed substantially vertical in the air cavity to help support the top conductive layer.

EXAMPLE 41

A method for fabricating an antenna on glass device, the method including:
 forming an air cavity in a photosensitive glass substrate; forming an air cavity structure that at least partially encloses the air cavity, wherein the air cavity structure at least partially formed from the photosensitive glass substrate; forming an antenna from portion of a top conductive layer disposed on a top surface of the air cavity structure, wherein the antenna at least partially overlaps the air cavity; and forming a metallization structure having a bottom conductive layer disposed on a bottom surface of the air cavity structure, wherein the bottom conductive layer is electrically coupled to the top conductive layer by a conductive pillar disposed through the photosensitive glass substrate.

EXAMPLE 42

The method of example 41, further including: forming one or more etch holes that extends to the air cavity through a portion of the air cavity structure.

EXAMPLE 43

The method of example 42, wherein forming the air cavity includes:
 defining a cavity region in the photosensitive glass substrate; converting glass material in the cavity region to a ceramic material; and removing the ceramic material to form the air cavity.

EXAMPLE 44

The method of example 43, wherein the ceramic material is removed through the one or more etch holes by an etching process.

EXAMPLE 45

The method of example 43, wherein converting glass material in the cavity region to a ceramic material by ultraviolet (UV) exposure using a laser beam with different focal depths.

EXAMPLE 46

The method of examples 41 through 45, wherein the photosensitive glass substrate includes: a first photosensitive glass substrate; and a second photosensitive glass substrate.

EXAMPLE 47

The method of example 46, wherein air cavity structure includes: a first beam formed from the first photosensitive glass substrate; and a sidewall formed from the second photosensitive glass substrate, wherein the sidewall is disposed from the first beam.

EXAMPLE 48

The method of example 46, wherein the first photosensitive glass substrate and the second photosensitive glass substrate each have a different optical bandgap.

EXAMPLE 49

The method of example 48, wherein the first photosensitive glass substrate has a wide optical bandgap and the second photosensitive glass substrate has a narrow optical and gap.

EXAMPLE 50

The method of example 46, wherein air cavity structure further includes: a third photosensitive glass substrate, wherein the first photosensitive glass substrate and the third photosensitive glass substrate each have the same optical bandgap.

It will be appreciated that various aspects disclosed herein can be described as functional equivalents to the structures, materials and/or devices described and/or recognized by those skilled in the art. For example, in one aspect, an apparatus may comprise a means for performing the various functionalities discussed above. It will be appreciated that the aforementioned aspects are merely provided as examples and the various aspects claimed are not limited to the specific references and/or illustrations cited as examples.

One or more of the components, processes, features, and/or functions illustrated in FIGS. 1-15 may be rearranged and/or combined into a single component, process, feature or function or incorporated in several components, processes, or functions. Additional elements, components, processes, and/or functions may also be added without departing from the disclosure. It should also be noted that FIGS. 1-15 and corresponding description in the present disclosure are not limited to dies and/or ICs. In some implementations, FIGS. 1-15 and its corresponding description may be used to manufacture, create, provide, and/or produce integrated devices including antenna on glass devices in accordance with the various aspects disclosed herein. In some implementations, a device may include a die, an integrated device, a die package, an integrated circuit (IC), a device package, an integrated circuit (IC) package, a wafer, a semiconductor device, a package on package (PoP) device, and/or an interposer.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), 5G New Radio, Bluetooth (BT), Bluetooth Low Energy (BLE), IEEE 802.11 (WiFi), and IEEE 802.15.4 (Zigbee/Thread) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described herein can be configured to perform at least a portion of a method described herein.

It should be noted that the terms "connected," "coupled," or any variant thereof, mean any connection or coupling, either direct or indirect, between elements, and can encompass a presence of an intermediate element between two elements that are "connected" or "coupled" together via the intermediate element unless the connection is expressly disclosed as being directly connected.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that-although a dependent claim can refer in the claims to a specific combination with one or a plurality of claims-other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions and/or functionalities of the methods disclosed.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. An antenna on glass device comprising:
   an air cavity at least partially formed in a photosensitive glass substrate;
   an air cavity structure that at least partially encloses the air cavity, wherein the air cavity structure is at least partially formed from the photosensitive glass substrate;
   an antenna formed from a portion of a top conductive layer disposed on a top surface of the air cavity structure which extends over the air cavity, wherein the antenna at least partially overlaps the air cavity; and
   a metallization structure having a bottom conductive layer disposed on a bottom surface of the air cavity structure, wherein the bottom conductive layer is electrically coupled to the top conductive layer by a conductive pillar disposed through the photosensitive glass substrate.

2. The antenna on glass device of claim 1, further comprising:
   an etch hole that extends to the air cavity through a portion of the air cavity structure.

3. The antenna on glass device of claim 2, wherein the portion is on a top beam of the air cavity structure.

4. The antenna on glass device of claim 1, further comprising a top insulating layer, wherein the top insulating layer is disposed over the top conductive layer.

5. The antenna on glass device of claim 4, wherein the top insulating layer is formed from at least one of silicon dioxide ($SiO_2$), an organic polymeric dielectric, polyimide (PI), polynorbornene, benzocyclobutene (BCB), polytetrafluoroethylene (PTFE) or silicone based polymeric dielectrics.

6. The antenna on glass device of claim 1, wherein the top conductive layer and the bottom conductive layer may each be formed of at least one of copper (Cu), silver (Ag), gold (Au), aluminum (Al), tungsten (W), nickel (Ni), or combinations thereof.

7. The antenna on glass device of claim 1, wherein the conductive pillar is a through-glass via (TGV).

8. The antenna on glass device of claim 1, further comprising:
   a metal-insulator-metal (MIM) capacitor.

9. The antenna on glass device of claim 8, wherein the MIM capacitor is formed using at least one conductive layer in the metallization structure.

10. The antenna on glass device of claim 9, wherein the MIM capacitor is formed using at least the bottom conductive layer of the metallization structure.

11. The antenna on glass device of claim 8, further comprising:
    an inductor.

12. The antenna on glass device of claim 11, wherein the inductor is formed using at least one conductive layer in the metallization structure.

13. The antenna on glass device of claim 12, wherein the inductor is one of a planar inductor, 2.5 Dimension (2.5 D) inductor or 3D inductor.

14. The antenna on glass device of claim 11, wherein MIM capacitor and the inductor are configured to form at least one of a filter or impedance matching circuit.

15. The antenna on glass device of claim 1, wherein the air cavity structure substantially encloses the air cavity.

16. The antenna on glass device of claim 1, wherein the air cavity structure is formed from a plurality of air cavities and each air cavity is connected by one or more cavity vents.

17. The antenna on glass device of claim 1, wherein the air cavity structure has an open side.

18. The antenna on glass device of claim 17, wherein the open side is a top side of the air cavity structure and a beam is formed substantially vertical in the air cavity to help support the top conductive layer.

19. The antenna on glass device of claim 17, wherein the open side is a bottom side of the air cavity structure.

20. The antenna on glass device of claim 1, further comprising:
    a bottom portion of the air cavity structure, wherein the bottom portion comprises a second glass material.

21. The antenna on glass device of claim 20, further comprising:
    a bonding layer, wherein the bonding layer is disposed between the photosensitive glass substrate and the second glass material.

22. The antenna on glass device of claim 20, wherein the photosensitive glass substrate and the second glass material have different permittivity (Dk) and loss tangent (Df) values.

23. The antenna on glass device of claim 20, wherein the conductive pillar extends through the second glass material.

24. The antenna on glass device of claim 20, wherein the bottom conductive layer is formed on a bottom surface of the bottom portion of the air cavity structure.

25. The antenna on glass device of claim 1, further comprising:
    a top beam of the air cavity structure, wherein the top beam is formed from a second material and the air cavity structure substantially encloses the air cavity.

26. The antenna on glass device of claim 25, wherein the second material forming the top beam is a low Dk and Df dielectric material.

27. The antenna on glass device of claim 25, wherein the second material is at least one of silicon dioxide ($SiO_2$) or benzocyclobutene (BCB).

28. The antenna on glass device of claim 1, further comprising:
a plurality of connection structures configured to electrically couple the metallization structure to one or more components that are external to the antenna on glass device.

29. The antenna on glass device of claim 1, wherein the antenna on glass device is incorporated into an apparatus selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

30. The antenna on glass device of claim 1, wherein the photosensitive glass substrate comprises:
a first photosensitive glass substrate; and
a second photosensitive glass substrate.

31. The antenna on glass device of claim 30, wherein the air cavity structure comprises:
a first beam formed from the first photosensitive glass substrate; and
a sidewall formed from the second photosensitive glass substrate, wherein the sidewall is coupled to the first beam.

32. The antenna on glass device of claim 31, wherein the air cavity structure comprises:
a second beam, wherein the sidewall is disposed between the first beam and the second beam.

33. The antenna on glass device of claim 32, wherein the second beam, is formed from a third photosensitive glass substrate.

34. The antenna on glass device of claim 30, wherein the first photosensitive glass substrate and the second photosensitive glass substrate each have a different optical bandgap.

35. The antenna on glass device of claim 34, wherein the first photosensitive glass substrate has a greater optical bandgap than the second photosensitive glass substrate.

36. The antenna on glass device of claim 35, wherein the first photosensitive glass substrate has an optical bandgap of 5.5 electronvolts (eV) and the second photosensitive glass substrate has an optical bandgap of 2.5 eV.

37. The antenna on glass device of claim 30, wherein the photosensitive glass substrate further comprises:
a third photosensitive glass substrate, wherein the first photosensitive glass substrate and the third photosensitive glass substrate each have a same optical bandgap.

38. A method for fabricating an antenna on glass device, the method comprising:
forming an air cavity in a photosensitive glass substrate;
forming an air cavity structure that at least partially encloses the air cavity, wherein the air cavity structure is at least partially formed from the photosensitive glass substrate;
forming an antenna from a portion of a top conductive layer disposed on a top surface of the air cavity structure which extends over the air cavity, wherein the antenna at least partially overlaps the air cavity; and
forming a metallization structure having a bottom conductive layer disposed on a bottom surface of the air cavity structure, wherein the bottom conductive layer is electrically coupled to the top conductive layer by a conductive pillar disposed through the photosensitive glass substrate.

39. The method of claim 38, further comprising:
forming one or more etch holes that extends to the air cavity through a portion of the air cavity structure.

40. The method of claim 39, wherein forming the air cavity comprises:
defining a cavity region in the photosensitive glass substrate;
converting glass material in the cavity region to a ceramic material; and
removing the ceramic material to form the air cavity.

41. The method of claim 40, wherein the ceramic material is removed through the one or more etch holes by an etching process.

42. The method of claim 40, further comprising converting the glass material in the cavity region to the ceramic material by ultraviolet (UV) exposure using a laser beam with different focal depths.

43. The method of claim 38, wherein the photosensitive glass substrate comprises:
a first photosensitive glass substrate; and
a second photosensitive glass substrate.

44. The method of claim 43, wherein the air cavity structure comprises:
a first beam formed from the first photosensitive glass substrate; and
a sidewall formed from the second photosensitive glass substrate, wherein the sidewall is coupled to the first beam.

45. The method of claim 43, wherein the first photosensitive glass substrate and the second photosensitive glass substrate each have a different optical bandgap.

46. The method of claim 45, wherein the first photosensitive glass substrate has a greater optical bandgap than the second photosensitive glass substrate.

47. The method of claim 46, wherein the photosensitive glass substrate further comprises:
a third photosensitive glass substrate, wherein the first photosensitive glass substrate and the third photosensitive glass substrate each have a same optical bandgap.

* * * * *